US011927039B2

(12) United States Patent
Ma et al.

(10) Patent No.: US 11,927,039 B2
(45) Date of Patent: Mar. 12, 2024

(54) LATCH MECHANISM

(71) Applicant: Center Design Pty Ltd, Queensland (AU)

(72) Inventors: Matthew Ma, Queensland (AU); Glen Pacholke, Queensland (AU); Nigel Spork, Queensland (AU); Andrew Cooksley, Queensland (AU)

(73) Assignee: Center Design Pty Ltd., Queensland (AU)

( * ) Notice: Subject to any disclaimer, the term of this patent is extended or adjusted under 35 U.S.C. 154(b) by 802 days.

(21) Appl. No.: 14/653,073

(22) PCT Filed: Dec. 20, 2013

(86) PCT No.: PCT/AU2013/001514
§ 371 (c)(1),
(2) Date: Jun. 17, 2015

(87) PCT Pub. No.: WO2014/094071
PCT Pub. Date: Jun. 26, 2014

(65) Prior Publication Data

US 2015/0330126 A1 Nov. 19, 2015

(30) Foreign Application Priority Data

Dec. 21, 2012 (AU) ................................ 2012905643

(51) Int. Cl.
*E05C 19/16* (2006.01)
*E05B 47/00* (2006.01)
(Continued)

(52) U.S. Cl.
CPC .......... *E05C 19/163* (2013.01); *E05B 47/004* (2013.01); *E05B 53/003* (2013.01);
(Continued)

(58) Field of Classification Search
CPC . E05C 19/163; E05C 9/00; E05C 9/04; E05C 16/168; E05B 47/004;
(Continued)

(56) References Cited

U.S. PATENT DOCUMENTS 144,288 A * 11/1873 Rand .................... E05B 53/003 292/38
809,628 A * 1/1906 Pretsman .............. E05B 53/003 292/38

(Continued)

OTHER PUBLICATIONS

International Search Report for International Application No. PCT/AU2013/001514 dated Mar. 17, 2014.

(Continued)

*Primary Examiner* — Christine M Mills
*Assistant Examiner* — Faria F Ahmad
(74) *Attorney, Agent, or Firm* — Olive Law Group, PLLC

(57) ABSTRACT

The present invention is directed to a latch mechanism for latching a door or window panel to a frame. The latch mechanism includes: a pair of first members, a first of the pair of first members being located in an upper region of either the door or window panel or the frame, and a second of the pair of first members being located in a lower region of either the door or window panel or the frame and a pair of second members, a first of the pair of second members being located in an upper region of the other of the door or window panel or the frame to the first of the pair of first members and a second of the pair of second members being located in a lower region of the other of the door or window panel or the frame to the second of the pair first members the second members being movable between an unlatched position and a latched position wherein the second members are brought into abutment with, or close proximity to, the respective first members, wherein the first members are adapted to move from the unlatched position to the latched (Continued)

position under a magnetic attraction to the respective second members when the door or window panel is brought into a closed condition and wherein the second members are coupled to a controller via one or more linkage members, wherein actuation of the controller results in moving the second members from the latched position to the unlatched position.

14 Claims, 19 Drawing Sheets

(51) Int. Cl.
*E05B 53/00* (2006.01)
*E05B 63/20* (2006.01)
*E05B 65/00* (2006.01)
*E05C 9/00* (2006.01)
*E05C 9/04* (2006.01)

(52) U.S. Cl.
CPC .......... *E05B 63/20* (2013.01); *E05B 65/0085* (2013.01); *E05C 9/00* (2013.01); *E05C 9/04* (2013.01); *E05C 19/168* (2013.01); *Y10S 292/36* (2013.01); *Y10T 292/0834* (2015.04); *Y10T 292/11* (2015.04)

(58) Field of Classification Search
CPC .... E05B 53/003; E05B 63/20; E05B 65/0085; Y10S 292/21; Y10S 292/36; Y10T 292/0834; Y10T 292/0836; Y10T 292/11; Y10T 292/54; Y10T 292/546
USPC ......... 292/32, 33, 251.5, 332, 333, DIG. 21, 292/DIG. 33
See application file for complete search history.

(56) References Cited

U.S. PATENT DOCUMENTS 2,238,266 A * 4/1941 Johnson ................ E05B 53/003 70/478
2,389,315 A * 11/1945 Kerr ........................... B60J 9/02 292/21
2,762,642 A * 9/1956 Jewett ................. E05B 65/1013 292/336
3,333,878 A * 8/1967 Pelcin ..................... E05C 9/043 292/37
3,433,180 A * 3/1969 Shook .................. B61D 45/006 410/137
3,516,701 A * 6/1970 Graham ................ E05C 19/163 292/144
3,794,366 A * 2/1974 Graham ................ E05C 19/163 292/144
3,953,061 A * 4/1976 Hansen ................... E05C 9/002 292/5
4,012,066 A * 3/1977 Salvatore .............. E05B 65/104 292/341.13
4,126,912 A * 11/1978 Johnson .............. E05D 15/0665 16/105
4,199,176 A * 4/1980 Kelly ....................... E05C 9/063 292/141
4,891,911 A * 1/1990 Yung ....................... E05F 1/025 16/81
5,131,188 A * 7/1992 Hutchison ................. E05F 1/16 16/72
5,319,880 A * 6/1994 Kuhlman .............. E05F 15/646 49/138
5,319,881 A * 6/1994 Kuhlman .............. E05F 15/646 49/138
5,375,894 A * 12/1994 Schlack .................. E05B 5/003 292/182
5,579,607 A * 12/1996 Braid ...................... E05F 1/025 16/81
5,590,917 A * 1/1997 Brooks ................. E05B 15/004 292/21
6,415,565 B1 * 7/2002 Sosa ................... E05B 17/2065 292/4
6,588,811 B1 * 7/2003 Ferguson .............. E05B 1/0007 16/320
6,929,293 B2 * 8/2005 Tonges .................... E05B 63/18 292/332
7,024,821 B2 * 4/2006 Lu ............................. E06B 3/50 49/158
7,686,405 B2 * 3/2010 Trulaske, Sr. .......... E05F 1/025 312/304
7,766,399 B2 * 8/2010 Howey ................. E05C 19/163 292/1.5
8,376,421 B2 * 2/2013 Simmonds ............ E05B 15/101 292/251.5
8,534,719 B2 * 9/2013 Chow ....................... E05C 1/16 292/175
8,776,859 B2 * 7/2014 Frederick ................ E06B 9/326 160/173 R
9,004,550 B2 * 4/2015 Carabalona ............. E05B 77/06 292/251.5
9,404,295 B2 * 8/2016 Baczuk ................... E05C 1/085
9,428,940 B1 * 8/2016 Patrick .................... E05B 63/14
9,441,414 B2 * 9/2016 Baczuk ................. E06B 3/4609
9,447,617 B2 * 9/2016 Smith ..................... E05C 17/56
2007/0138802 A1 * 6/2007 Stasko .................... E05B 81/14 292/201
2011/0148126 A1 * 6/2011 Macernis ............ E05B 65/0007 292/251.5
2011/0193354 A1 * 8/2011 Simmonds ............ E05B 15/101 292/251.5
2012/0043767 A1 * 2/2012 Fehr .................... E05B 65/0817 292/203
2012/0074714 A1 * 3/2012 Saccon ...................... E05B 5/00 292/157
2013/0154283 A1 * 6/2013 Arlinghaus ......... E05B 65/1093 292/214
2014/0265355 A1 * 9/2014 Tien .................... E05B 17/2053 292/21
2016/0002961 A1 * 1/2016 Graham .............. E05B 17/2084 292/163
2016/0002963 A1 * 1/2016 Kondi ................. E05B 65/1006 292/5

OTHER PUBLICATIONS

SU 648709 A (Budnik) Feb. 28, 1979 & Derwent Abstract Accession No. 197-K9215B.
NL 8204459 A (Van Dillen) Jun. 18, 1984 & Derwent Abstract Accession No. 1984-174753.
International Preliminary Report on Patentability for International Application No. PCT/AU2013/001514.
Written Opinion for International Application No. PCT/AU2013/001514.

* cited by examiner

LATCH MECHANISM

CROSS REFERENCE TO RELATED APPLICATIONS

This application is a 35 USC 371 application of International PCT Patent Application No. PCT/AU2013/001514, filed on Dec. 20, 2013, which claims priority to Australian Patent Application No. 2012905643 filed Dec. 21, 2013; all of the contents of which are hereby incorporated by reference herein in their entireties.

TECHNICAL FIELD

The present invention relates to a latch mechanism for a door or window panel. In particular, the invention is directed to a latch mechanism associated with a bifold door or window panel and assembly, although the scope of the invention is not necessarily limited thereto.

BACKGROUND ART

Conventionally, bifold door or window panels are secured against horizontal members of a door or window frame via latch bolts at an upper and/or lower end of the door panel. A user is typically required to individually unlock each latch bolt before opening the door or window. Similarly, when securing the door or window in a closed position, the user is required to individually lock each latch bolt to securely lock the door or window.

Some bifold door or window panels use twin-point latch bolts (i.e. latch bolts configured at the upper and lower ends of the door or window panel) connected to a common central lever handle. The lever handle is used to manually move the twin-point latch bolts between the latched and unlatched positions.

One drawback with conventional bifold doors or windows is that individually operating each latch bolt or manually operating a lever handle on each door or window panel can be inconvenient and time consuming. Moreover, it is easy for the user to inadvertently leave one or more latch bolts or panels unlocked. If this occurs, the door or window may be blown open in windy conditions. Further, a failure to properly latch the bifold door or window increases the ease with which burglars can enter a building through the unlatched door or window.

In light of the foregoing, there would be an advantage if it were possible to provide a latch mechanism that ensured the secure latching of bifold door and window assemblies.

An embodiment of the present invention is directed to a latch mechanism for a bifold door or window panel, which may at least partially overcome at least one of the above-mentioned disadvantages or provide the consumer with a useful or commercial choice.

It will be clearly understood that, if a prior art publication is referred to herein, this reference does not constitute an admission that the publication forms part of the common general knowledge in the art in Australia or in any other country.

SUMMARY OF INVENTION

According to one aspect of the invention, there is provided a latch mechanism for latching a door or window panel to a frame, the latch mechanism including a pair of first Members, a first of the pair of first members being located in an upper region of either the door or window panel or the frame, and a second of the pair of first members being located in a lower region of either the door or window panel or the frame and a pair of second members, a first of the pair of second members being located in an upper region of the other of the door or window panel or the frame to the first of the pair of first members and a second of the pair of second members being located in a lower region of the other of the door or window panel or the frame to the second of the pair first members the second members being movable between an unlatched position and a latched position wherein the second members are brought into abutment with, or close proximity to, the respective first members, wherein the first members are adapted to move from the unlatched position to the latched position under a magnetic attraction to the respective second members when the door or window panel is brought into a closed condition and wherein the second members are coupled to a controller via one or more linkage members, wherein actuation of the controller results in moving the second members from the latched position to the unlatched position.

Typically, the first members and the second members are disengaged from one another in the unlatched position.

The first members may be configured for mounting to the door or window panel, and the second members may be configured for mounting to the frame. Alternatively, the first members may be configured for mounting to the frame, and the second members may be configured for mounting to the door or window panel. The first and second members may be mounted at any suitable location on the panel and frame. Preferably, the first member is fixed to either the panel or the frame and is precluded from movement relative thereto.

Typically, the door or window panel is secured to the frame in the closed condition when the second members are in their latched positions and magnetically engaged with the first members; and the panel is movable relative to the frame when the second members are in their unlatched position and disengaged from the first members.

In one embodiment, the first members includes magnetic material and the second members includes ferromagnetic material. In an alternative embodiment, the second members includes magnetic material and the first members includes ferromagnetic material. In a further embodiment, each of the first and second members includes a combination of magnetic and ferromagnetic materials.

The second members may be of any suitable size, shape or configuration. However, in a preferred embodiment of the invention, the second members may be magnetic rods, bars or bolts configured for mounting on or adjacent an upper and/or lower edge of the door or window panel such that at least a portion of the rod protrudes from the upper and/or lower edge of the panel in the latched position. The second members may be at least partially received in recesses within the door or window panel when in the unlatched position. When moving between the unlatched and latched positions, it is envisaged that the rod will move either substantially upwardly towards the first member (if the first member is located on the head of the frame) or substantially downwardly towards the first member (if the first member is located on the sill of the frame).

Alternatively, the second members may be mounted in a recess of the door or window panel or flush mounted to one face of the door or window panel.

The first members may be of any suitable form. However, in a preferred embodiment of the invention, the first members may comprise a ferromagnetic block mounted on the frame. Preferably, the first members may be configured for mounting in the frame in alignment with the second members when the panel is in a closed condition. In the latched position, the second members may be inserted into an opening (such as a bore or recess) in the frame and magnetically engaged with the first member located at the inner end of the opening. Alternatively, the first members may be mounted to an external surface of the frame or on a side of the frame in alignment with the first members.

It is also envisaged that the second members may be located on a vertical edge of the door or window panel. In this embodiment of the invention, the second members may move outwardly from the vertical edge of the panel (for instance, in a substantially horizontal direction) to engage with a first member located on a jamb of the door or window frame. This arrangement may be used for any door or window, although it may be particularly suitable for use with an awning window.

The second members may automatically move from the unlatched position to the latched position so as to engage with the first members when the panel is aligned with the frame. The movement of the second members between the unlatched position and the latched position may be effected by magnetic attraction between the first and second members.

In some embodiments of the invention, the latch mechanism may include a controller. The second members may be coupled to the controller for moving the second members from the latched position to the unlatched position. The controller may include one or more handles, buttons, levers, dials or a combination thereof.

In this embodiment of the invention, the second members may be connected to the controller via one or more linkage members. The one or more linkage members may be located within the panel, and may extend generally parallel to a vertical edge of the panel. The controller may be moved in one direction (by rotation, linear movement, pivotal movement or the like, or a combination thereof) to move the second members from the latched position to the unlatched position against the magnetic attraction between the first members and the second members. In particular, the one or more linkage members may be caused to pull the second members inwardly with respect to the panel and away from the frame when the controller is moved in one direction. The controller may be located at any suitable position on the panel, although preferably the controller is accessible from an intermediate height location of the panel so that users of different heights will be able to access the controller.

The one or more linkage members may be of any suitable form. Preferably, however, the one or more linkage members comprise one or more elongate members extending between the second member and the controller. The one or more elongate members may be of any suitable form, such as, but not limited to, one or more wires, rods, cables or the like, or a combination thereof.

In some embodiments of the invention, one or more retention members may be provided so as to retain the second members in the unlatched position once the controller has been actuated. For instance, the retention members may be adapted to move into a position to prevent the second members from moving between the unlatched position and the latched position. Preferably, the retention members physically prevent the second members from moving between the unlatched position and the latched position, for instance by blocking the path along which the second members moves between the unlatched position and the latched position. Any suitable retention members may be provided, such as one or more caps, plates, rods, toggles or the like, or any suitable combination thereof. The retention members may move into position in any suitable manner, such as sliding, pivoting or the like. The movement of the retention means may be achieved manually or automatically. For instance, in one embodiment of the invention, the movement of the retention means may be achieved through the actuation of a locking mechanism.

In other embodiments of the invention, the retention members may comprise one or more biasing members (such as springs, tubes of compressible material etc.) that naturally bias the second members into the unlatched position once the magnetic attraction between the first members and the second members is broken.

It is envisaged that the latch mechanism may comprise both biasing members to bias the second members into the unlatched position and retention members that physically prevent the second members from moving from the unlatched position to the latched position.

In embodiments of the invention in which the linkage members comprise cables, it is envisaged that slack may be allowed to exist in the cables when the second members are in the unlatched position. In this embodiment of the invention, it is envisaged that the biasing member will retain the second members in the unlatched position so that the second members do not move into the latched position due to the slack in the cables.

Where the linkage members comprise cables, it is envisaged that tension in the cables may decrease over time. Thus, in some embodiments of the invention the latch mechanism may further comprise a tension adjustment mechanism. The tension adjustment mechanism may be of any suitable form, although it is preferred that the tension adjustment mechanism may be accessed from the exterior of the door or window panel. Preferably, the tension adjustment mechanism may be actuated manually, and a user may be able to actuate the tension adjustment mechanism using their fingers or a tool (such as a screwdriver, Allan key or the like).

In embodiments of the invention in which a latch mechanism is provided in both the upper and lower regions of the door or window panel, it is envisaged that a first linkage member may extend between the second member in an upper region of the panel and the controller and a second linkage member may extend between the second member in the lower region of the panel and the controller. While each linkage member may be provided with its own controller, it is preferred that both linkage members are actuated simultaneously by a single controller.

A single tension adjustment mechanism may be provided for a controller. In this embodiment of the invention, the adjustment of the tension adjustment mechanism may result in a simultaneous adjustment of the tension in each linkage member associated with the controller. More preferably, however, each linkage member may be provided with its own tension adjustment mechanism. In this way, the tension of each linkage member may be adjusted independently of any other linkage members associated with the controller.

The tension adjustment mechanism may function in any suitable manner. For instance, the tension adjustment mechanism may wind or unwind the linkage member about a drum, barrel or spool in order to increase or decrease the tension in the linkage member. Alternatively, the linkage member may be fabricated from an elastically-deformable material in which case the adjustment of the tension adjustment mechanism may result in the elastic deformation of the linkage member so as to adjust the tension therein. In another embodiment of, the invention, adjustment of the tension adjustment mechanism may result in changing the distance between the controller and the second members. In this embodiment, decreasing the distance between the controller and the second members may result in a decrease in the tension in the linkage member, while increasing the distance between the controller and the second members may result in an increase in the tension in the linkage member.

Still further, the tension adjustment mechanism may comprise one or more tension adjustment members which, upon adjustment of the tension adjustment mechanism, adjust the position of the linkage member in order to increase or decrease the degree of slack in the linkage member.

It is envisaged that the door or window panel may comprise a front surface and a back surface and one or more edge surfaces that extend between the front and back surfaces. The edge surfaces will typically be located at the horizontal edges of the panel, although in embodiments of the invention in which the door or window panel is provided with a region in which glass, mesh or screen material is located, edge surfaces may extend between the front and back surfaces at the edges of the region. While not necessarily the case, it is envisaged that the edge surfaces may be provided at an angle substantially perpendicular to the front and back surfaces.

In some embodiments of the invention, the latch mechanism may include a locking mechanism. The locking mechanism may be of any suitable form, and may be locked using any suitable technique (manually or automatically). Preferably, however, the locking mechanism is actuated through the use of a key.

The locking mechanism is preferably provided on an edge surface of the door or window panel. It is envisaged that the locking mechanism may be provided with a key barrel, and that the key barrel extends into the panel at an angle substantially perpendicular to the edge surface of the panel (i.e. substantially parallel to the front and back surfaces of the panel).

By locating the locking mechanism on an edge surface of the panel, adjacent panels of a folding door or window may be brought into abutment with one another when the door or window is folded without the key coming into contact with an adjacent panel, which could cause damage to the key, the locking mechanism and/or the panel. In addition, by locating the locking mechanism on an edge surface of a panel, the aesthetic appeal of the front and back surfaces is not disturbed by the presence of the locking mechanism.

It is envisaged that, when the locking mechanism is locked, the controller will be prevented from actuating, thereby ensuring that the second members are retained in whichever of the latched or unlatched positions it is in when the locking mechanism is locked (i.e. locking of the locking mechanism precludes the second members from moving between the unlatched position and the latched position). In addition, in some embodiments of the invention, the locking of the locking mechanism may actuate the retention members that physically prevent the second members from moving between the unlatched position and the latched position.

Alternatively, the second members may be coupled to an electronic controller for automatic control. For example, the second members may be an electromagnet and the electronic controller may control the current and thus the magnetic field of the electromagnet. To move the electromagnetic second members from their latched position to their unlatched position, the electronic controller may be used to turn off the current to thereby switch off the magnetic field of the electromagnetic second members. Without any magnetic attraction between the first and second members, the second members may automatically move under gravity (or by using a handle, lever, dial or the like) from its latched position to its unlatched position such that the panel is no longer secured to the frame and thus can be freely movable relative to the frame. Once the panel is aligned with the frame, the panel may be secured to the frame by using the electronic controller to turn on the magnetic field of the electromagnetic second member. The magnetic attraction between the first members and the second members may move the second members from the unlatched position to the latched position.

In another alternative embodiment, the second members may be directly pulled from one end by a user's hand against the magnetic attraction between the first members and the second members so as to move the second members from the extended position to the retracted position. The second members may have a handle, dial or the like attached thereto. A user may use the handle or dial to control the position of the second members.

It is envisaged that the magnetic attraction between the first and second members will be sufficiently strong to prevent accidental disengagement, such as in conditions of strong winds. Further, the magnetic attraction between the first and second members may be sufficient strong to prevent disengagement (and therefore opening of the door or window) when a force is applied to the door or window (such as by a person, animal or object placed against the door or window).

In some embodiments of the invention, only a single panel of a door or window may be provided with a latch mechanism. However, in other embodiments two or more panels of the door or window may be provided with a latch mechanism. In this way, each panel that is provided with a latch mechanism may be latched so as to provide improved security and latching capability.

In embodiments of the invention in which two or more panels are provided with a latch mechanism, it is envisaged that each latch mechanism may be actuated independently of the other latch mechanisms. In this way, in folding doors or windows for example, some panels may be open (for access or to allow a breeze therethrough) while others may be latched to prevent accidental or unwanted opening. However, if desired, a single release mechanism (such as an electronic controller) could be provided to latch and unlatch all of the latch mechanisms simultaneously.

According to another aspect of the invention, there is provided a door or window panel including a latch mechanism for securing the panel to a frame, the latch mechanism including a pair of first members, a first of the pair of first members being located in an upper region of the frame, and a second of the pair of first members being located in a lower region of the frame and a pair of second members, a first of the pair of second members being located in an upper region of the door or window panel and a second of the pair of second members being located in a lower region of the door or window panel, the second members being movable between an unlatched position and a latched position wherein the second members are brought into abutment with, or close proximity to, the respective first members, wherein the first members are adapted to move from the unlatched position to the latched position under a magnetic attraction to the respective second members when the door or window panel is brought into a closed condition and wherein the second members are coupled to a controller via one or more linkage members, wherein actuation of the controller results in moving the second members from the latched position to the unlatched position.

The latch mechanism may be configured for mounting on a top edge or lower edge of the panel (and, more specifically, proximate a top edge corner or lower edge corner of the panel) such that the second members at least partially protrudes from a top edge or lower edge of the panel in the latched position.

The latch mechanism may be controlled via individual controllers or a common controller. The individual and common controllers may include handles, buttons, levers, dials or the like, or a combination thereof.

According to a further aspect of the invention, there is provided a door or window assembly having a plurality of door or window panels, wherein at least one panel includes a latch mechanism for securing the at least one panel to a frame, the latch mechanism including:

a pair of first members, a first of the pair of first members being located in an upper region of the frame, and a second of the pair of first members being located in a lower region of the frame and a pair of second members, a first of the pair of second members being located in an upper region of the door or window panel and a second of the pair of second members being located in a lower region of the door or window panel, the second members being movable between an unlatched position and a latched position wherein the second members are brought into abutment with, or close proximity to, the respective first members, wherein the first members are adapted to move from the unlatched position to the latched position under a magnetic attraction to the respective second members when the door or window panel is brought into a closed condition and wherein the second members are coupled to a controller via one or more linkage members, wherein actuation of the controller results in moving the second members from the latched position to the unlatched position.

Advantageously, the magnetic attraction between the first and second members allows the latch mechanism to automatically move into a latched position from an unlatched position when the door or window is closed and properly aligned within the frame. This automatic locking feature removes the need for the user to individually lock each latch mechanism once the door or window is closed. The automatic locking feature further mitigates the risk of the user inadvertently leaving a latch mechanism unlocked. The security and operating convenience of the door or window according to the present invention is thereby improved.

It will be understood that the latch mechanism of the present invention could be used on any suitable door or window. For instance, the latch mechanism could be used on folding doors or windows. The folding windows or doors may have any suitable number of panels (typically two or more). Alternatively, the latch mechanism could be used on a door or window having a single panel (for instance, a swinging door or window hingedly or pivotally attached to an edge—and a jamb in particular—of a door or window frame). In other embodiments of the invention, the door or window may be a sliding door or window having one or more panels.

The latch mechanism of the present application may be, used on any suitable panel of a door or window. For instance, in doors or windows having two or more panels, the "access" panel (i.e. the panel that, when the door or window is closed, is the first to be opened to provide access therethrough) may be provided with a conventional door or window opening mechanism (such as a door handle or the like), while one or more of the other panels may be provided with the latch mechanism of the present invention. Alternatively, the "access" panel may be provided with the latch mechanism, such that actuation of the latch mechanism results in the opening of the door or window from its closed condition.

Similarly, when the latch mechanism is provided on a door or window having a single panel (for instance, a swinging door or window hingedly or pivotally attached to an edge—and a jamb in particular—of a door or window frame), the latch mechanism may be used as the door or window opening mechanism.

In another aspect, the invention resides broadly in a locking mechanism for a door or window, the door or window comprising a front surface, a back surface and one or more edge surfaces extending between the front and back surfaces, wherein the locking mechanism includes a key barrel, the key barrel located on an edge surface and extending into the edge surface at an angle substantially parallel to the front and back surfaces.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1A:
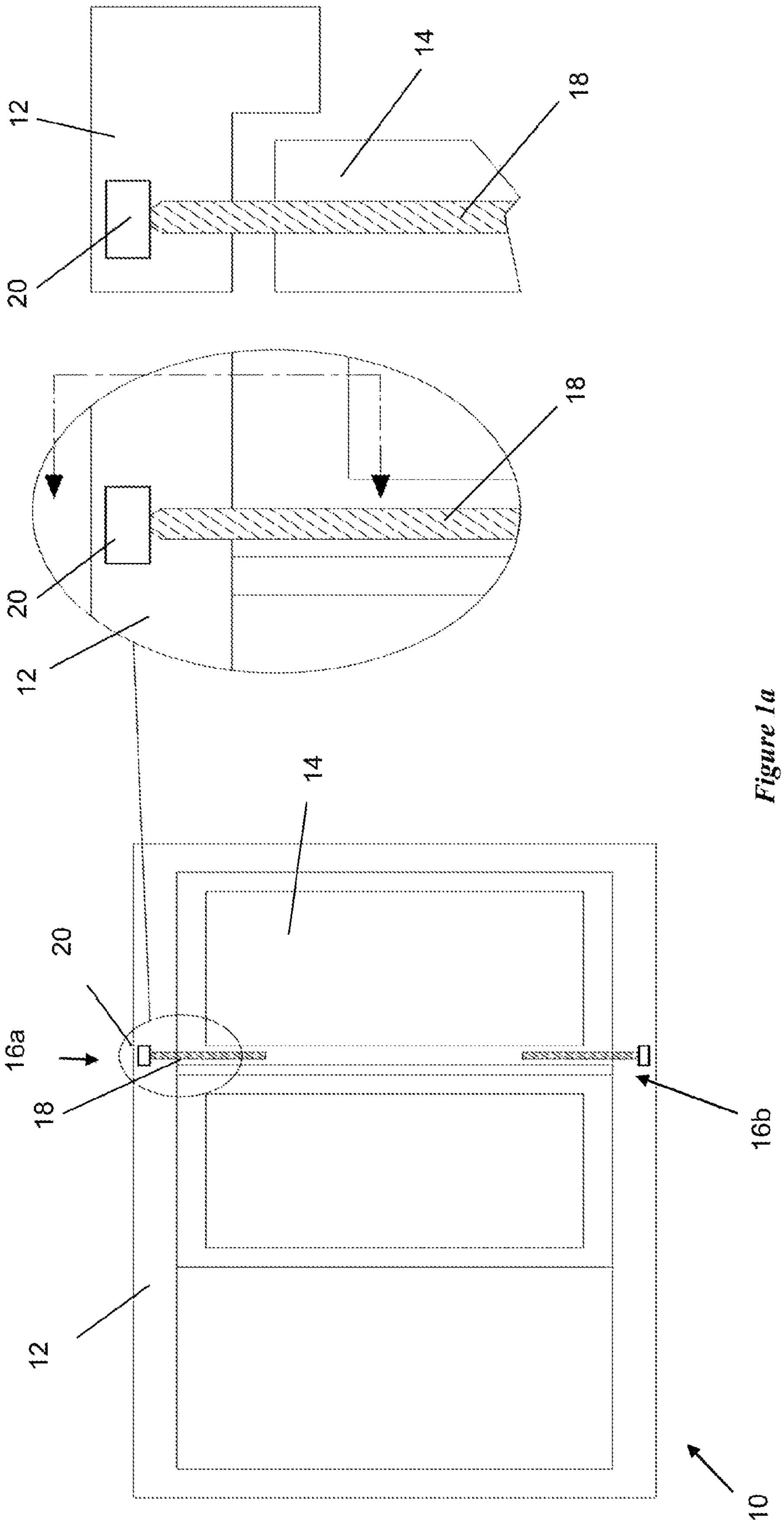
FIG. 1*a* shows a bifold door having a latch mechanism in the latched position according an embodiment of the present invention.

FIG. 1*a* illustrates a bifold door 10 having three door panels (only two shown) attached to a bifold door frame 12. One of the door panels 14 has two latch mechanisms 16*a*, 16*b*. One latch mechanism 16*a* is mounted proximate a top left corner of the door panel 14, and the other latch mechanism 16*b* is mounted proximate a bottom left corner of the door panel 14.

Each latch mechanism 16*a*, 16*b* includes a magnetic bolt 18 mounted in the door panel 14 and a ferromagnetic block 20 mounted in the door frame 12. The door frame 12 defines a channel opening (not shown) directly below the ferromagnetic block 20 to allow magnetic engagement between the magnetic bolt 18 and the ferromagnetic block 20 when the latch mechanism 16 in the latched position as shown in FIG. 1*a*.

When each latch mechanism 16*a*, 16*b* is in its latched position as shown in FIG. 1*a*, the respective magnetic bolt 18 is held within the respective channel opening of the door frame 12 so as to prevent movement of the door panel 14. The door panel 14 is thereby locked in position by the latch mechanisms 16*a*, 16*b*.

Figure 1B:
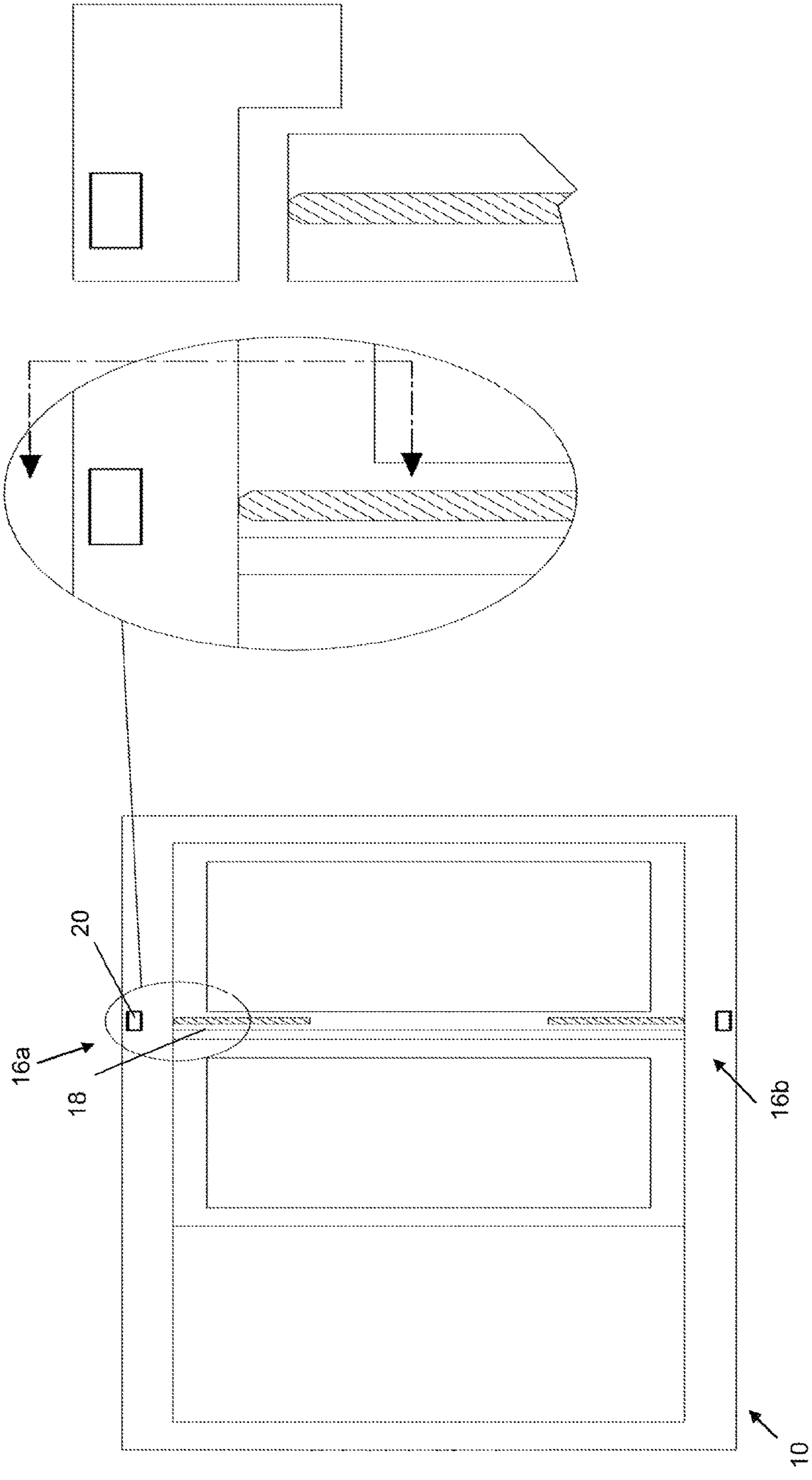
FIG. 1*b* shows the bifold door of FIG. 1*a* in which the latching mechanism is in the unlatched position.

Now referring to FIG. 1B, the door panel 14 can be unlocked from the door frame 12 by withdrawing the magnetic bolt 18 of each latch mechanism 16*a*, 16*b* from the respective channel opening of the door frame 12. Once the magnetic bolt 18 is withdrawn, the door panel 14 is freely movable relative to the door frame 12.

Figure 2A:
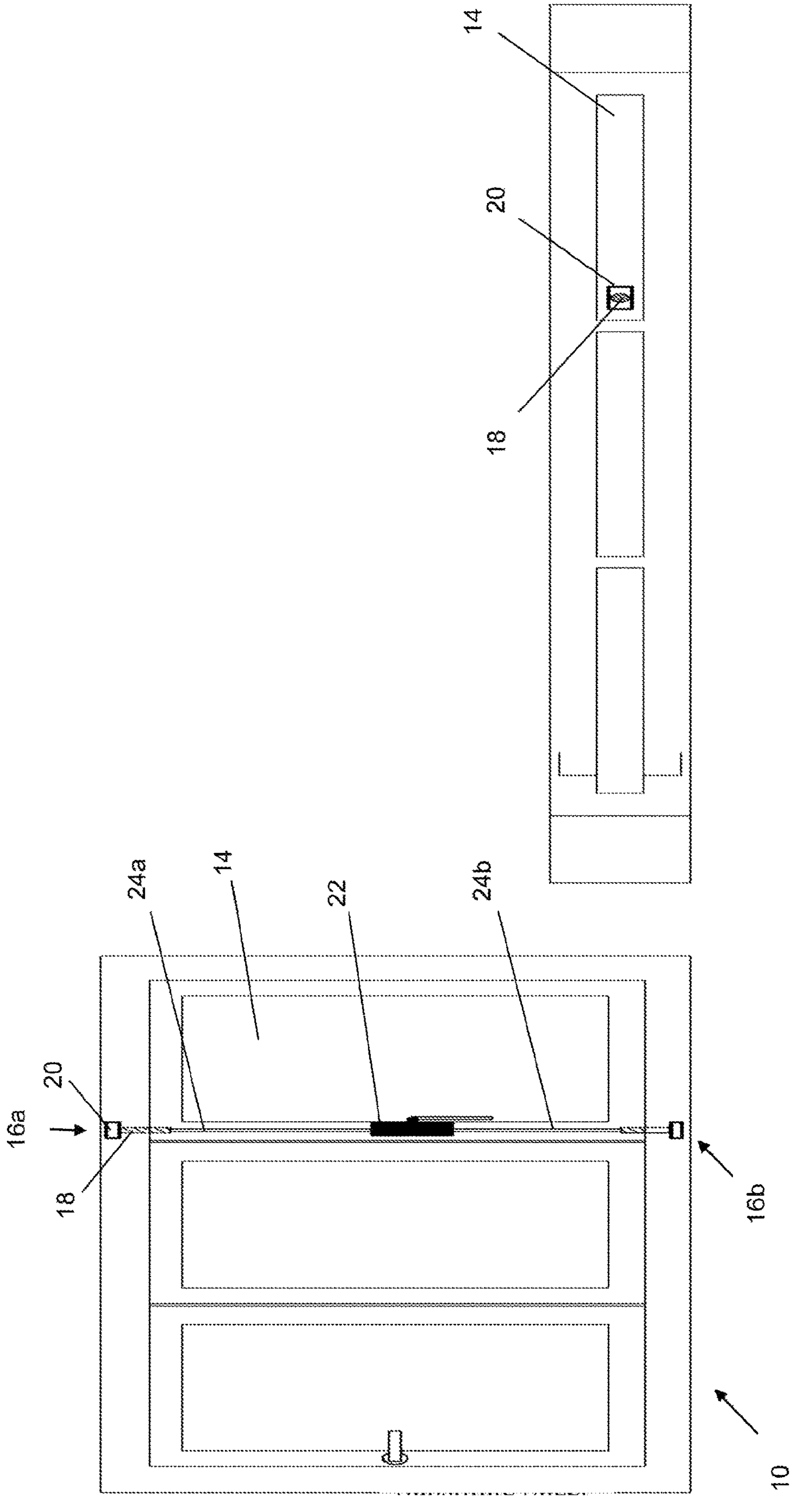
FIGS. 2*a* to 2*d* illustrate the unlocking and opening sequence of a bifold door according to an embodiment of the present invention.

FIG. 2*a* illustrates that in one embodiment of the present invention, the movement of the magnetic bolt 18 can be controlled by a lever handle 22. The magnetic bolt 18 of each latch mechanism 16 is coupled to the lever handle 22 via a respective linking arm 24*a*, 24*b*. When the lever handle 22 is moved in one direction (e.g. anticlockwise), the linking arms 24*a*, 24*b* pull on one end of the magnetic bolts 18 to thereby withdraw the magnetic bolts 18 from the door frame 12.

The sequence of drawings FIGS. 2*a* to 2*d* illustrate the unlocking and opening of bifold door 10 in side view (left) and top view (right).

In FIG. 2*a*, the bifold door 10 is closed and locked. For each latch mechanism 16, the magnetic bolt 18 is held by the ferromagnetic block 20 within the respective channel opening of the door frame 12.

Figure 2B:
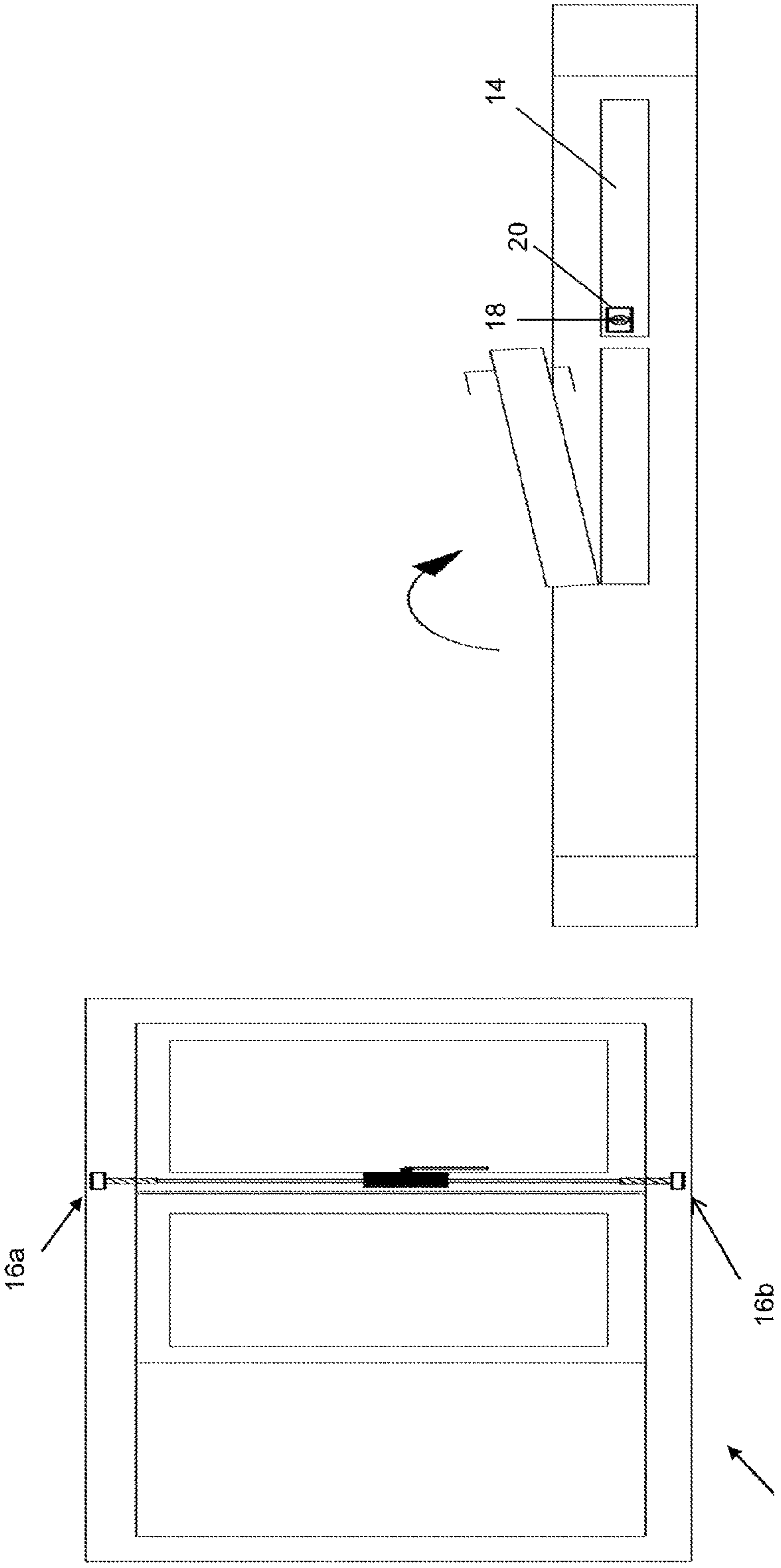
Figure 2C:
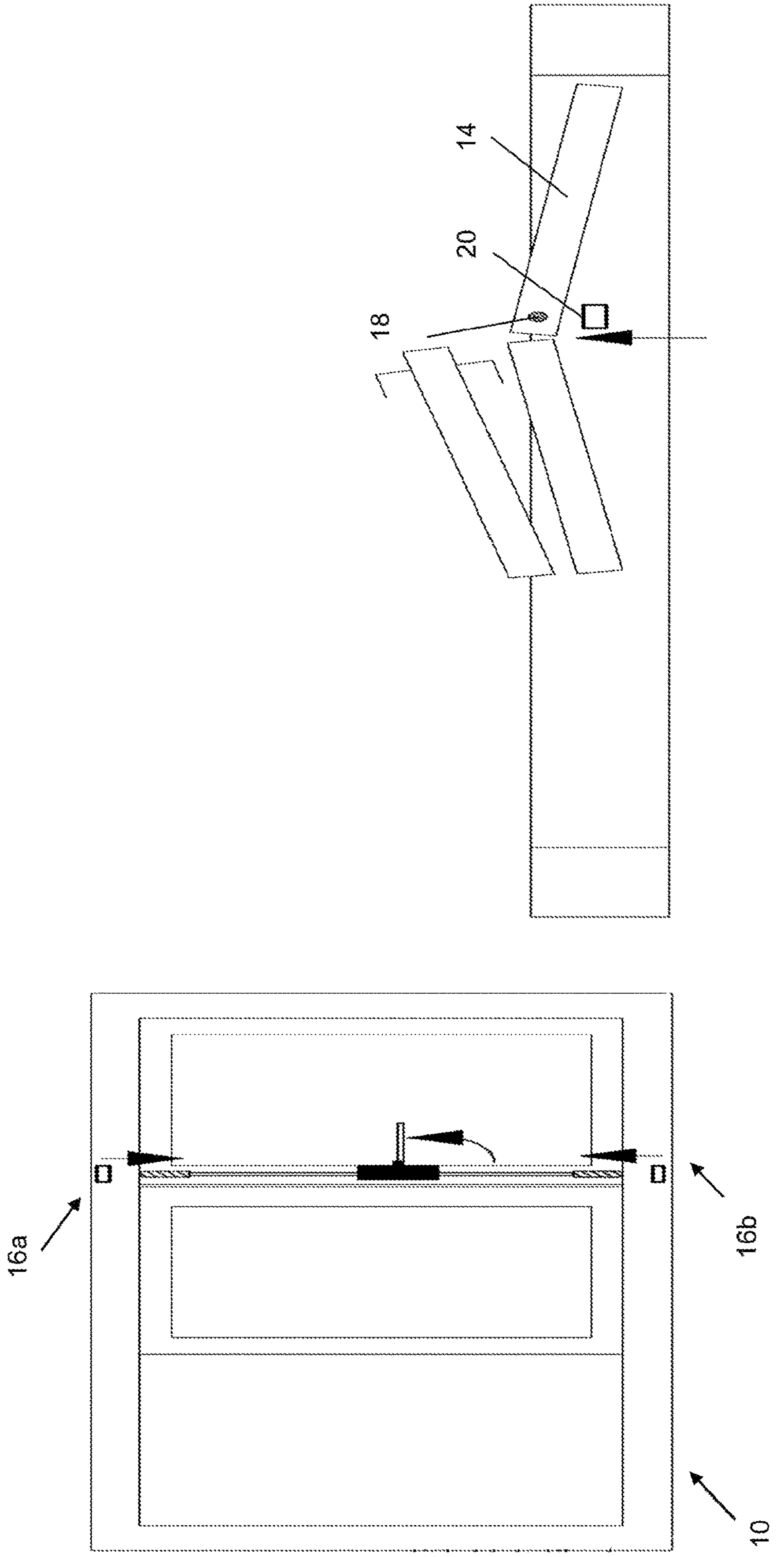
Figure 2D:
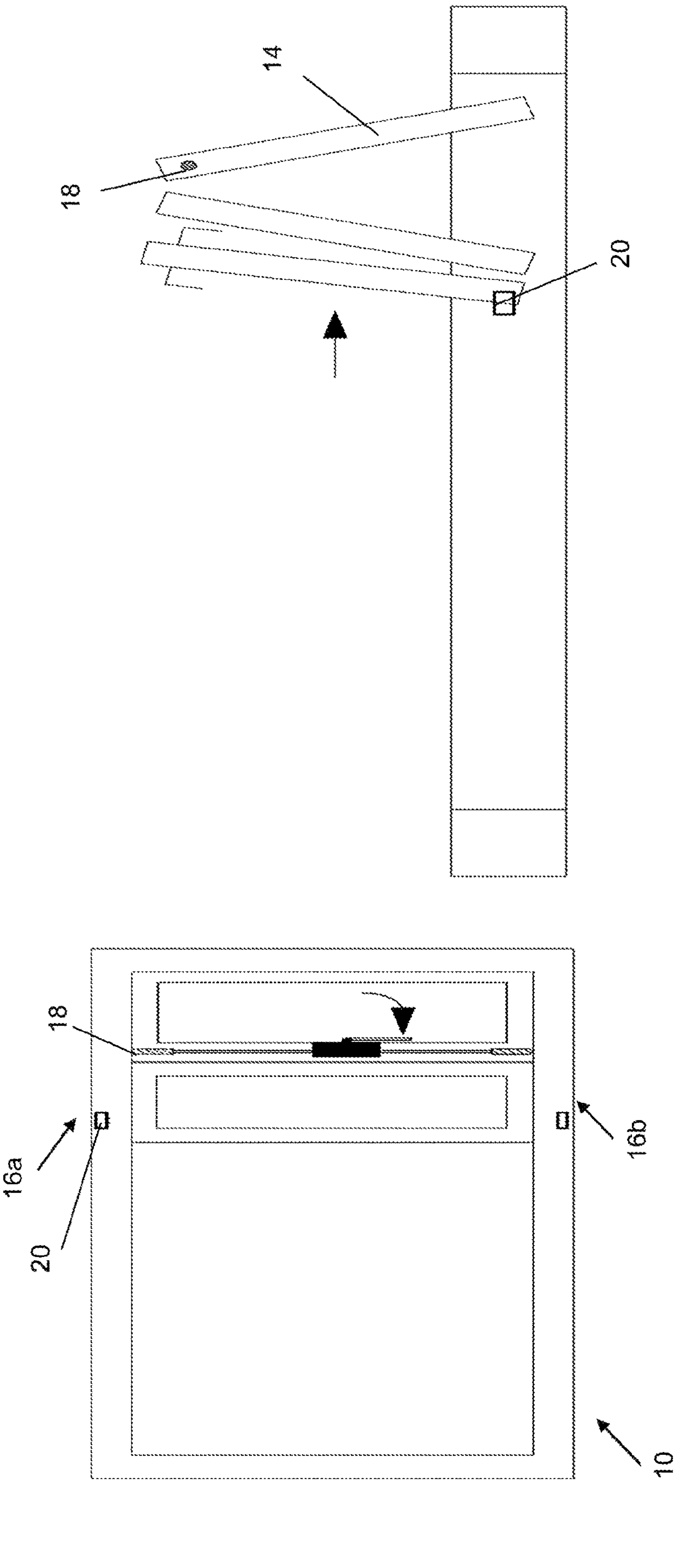

As shown in FIGS. 2*b* to 2*c*, the left most door panel is first opened in the conventional manner, then the lever handle 22 is moved anticlockwise to withdraw the magnetic bolts 18 from the door frame 12. Once the bolts 18 of the latch mechanisms 16 are withdrawn, the door panel 14 is unlocked and the bifold can be pushed open as shown in FIG. 2*d*.

The sequence of drawings FIGS. 3*a* to 3*d* illustrate the closing and locking of bifold door 10 in side view (left) and top view (right).

Figure 3A:
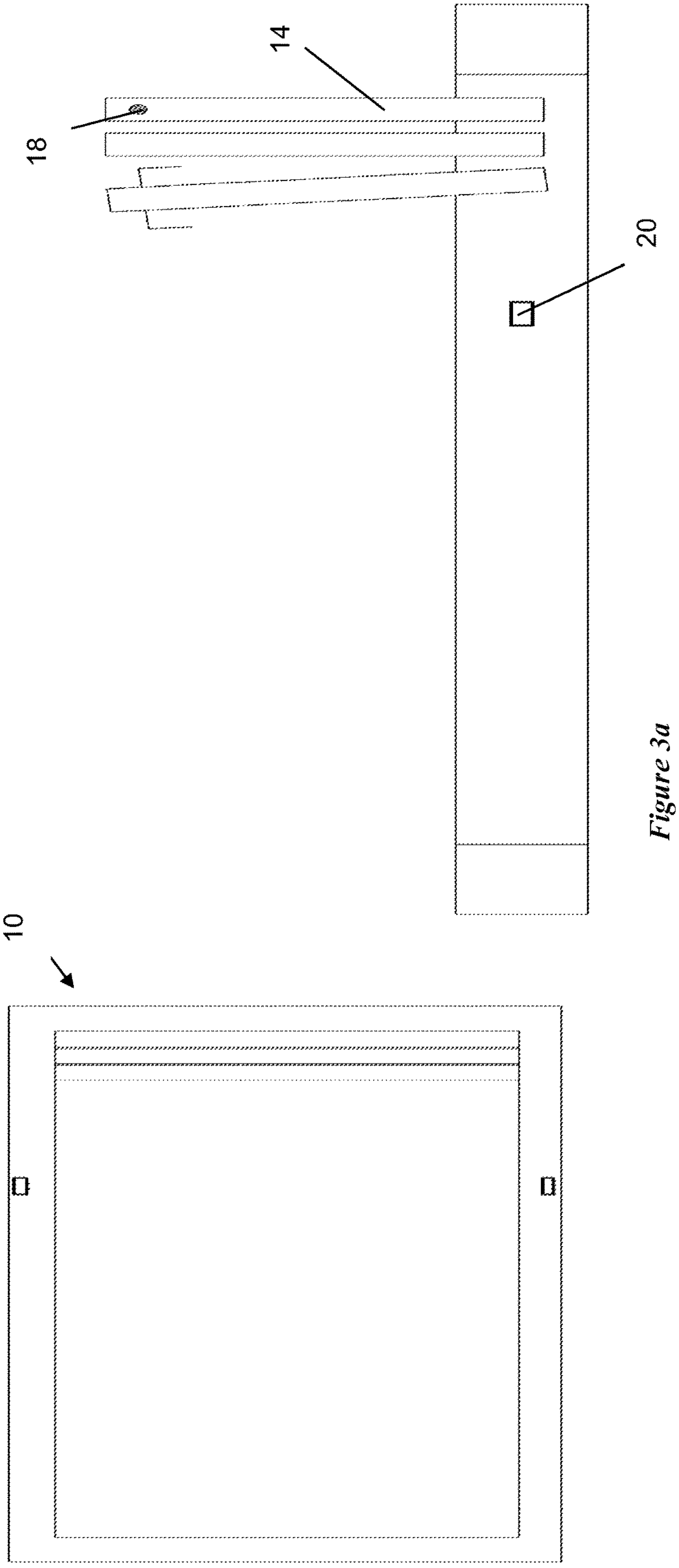
FIGS. 3*a* to 3*d* illustrate the closing and locking sequence of the bifold door of FIG. 3.
Figure 3B:
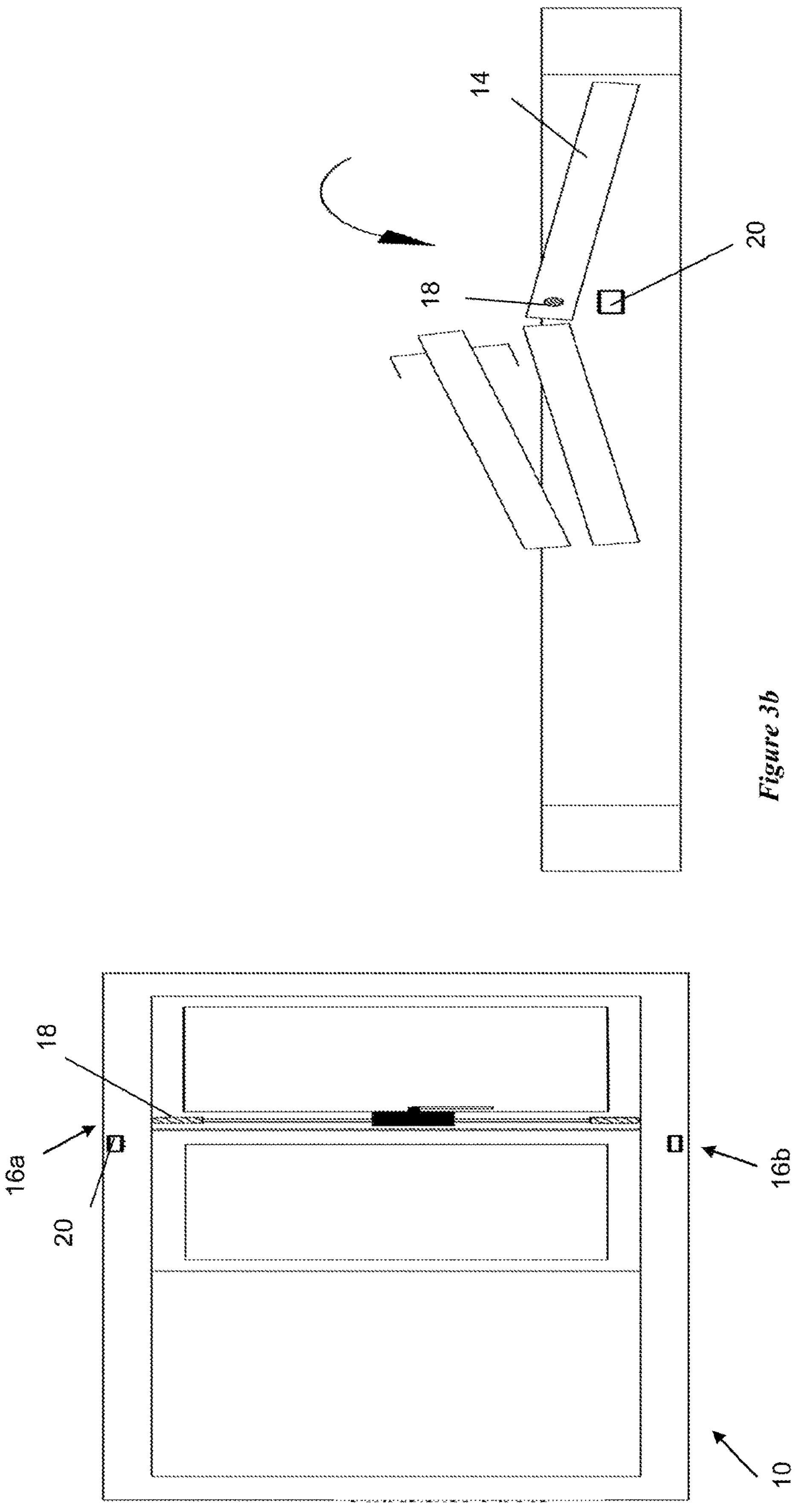
Figure 3C:
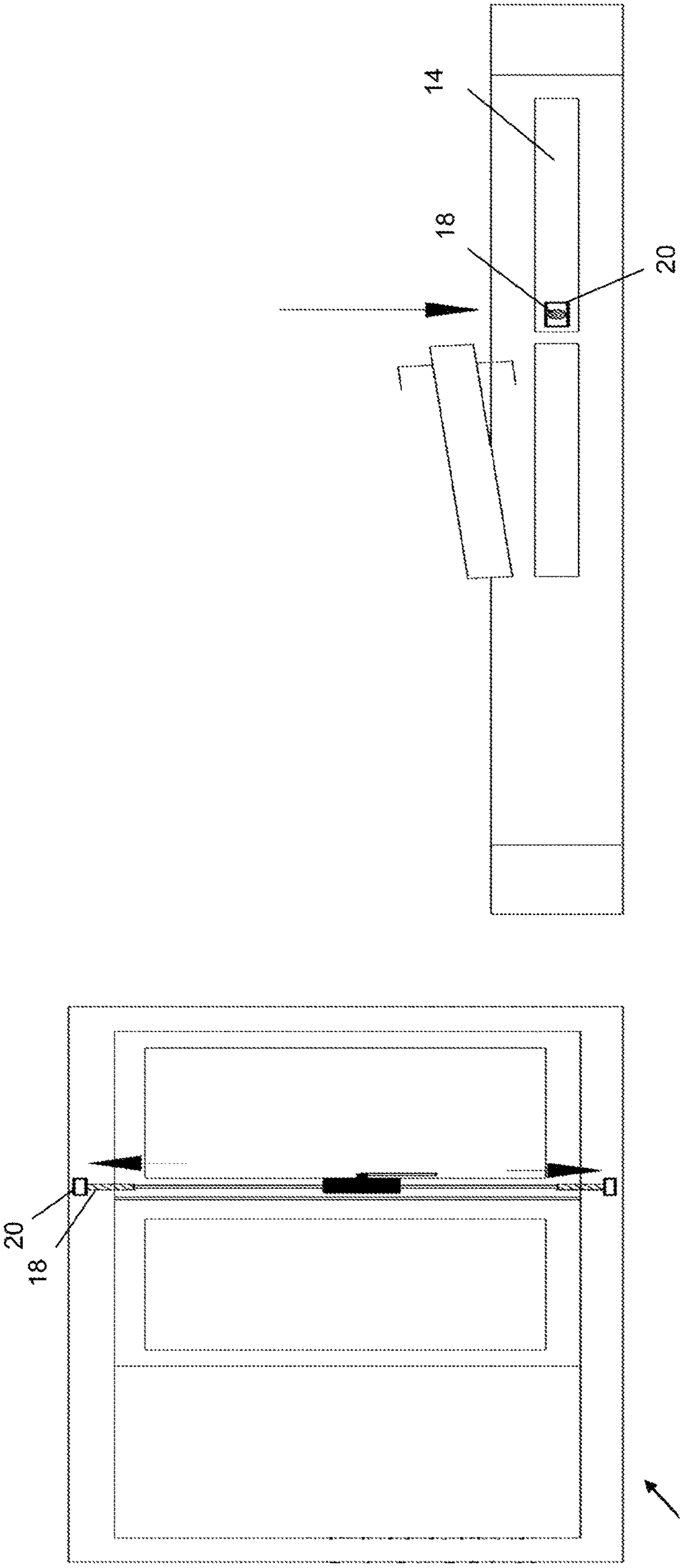
Figure 3D:
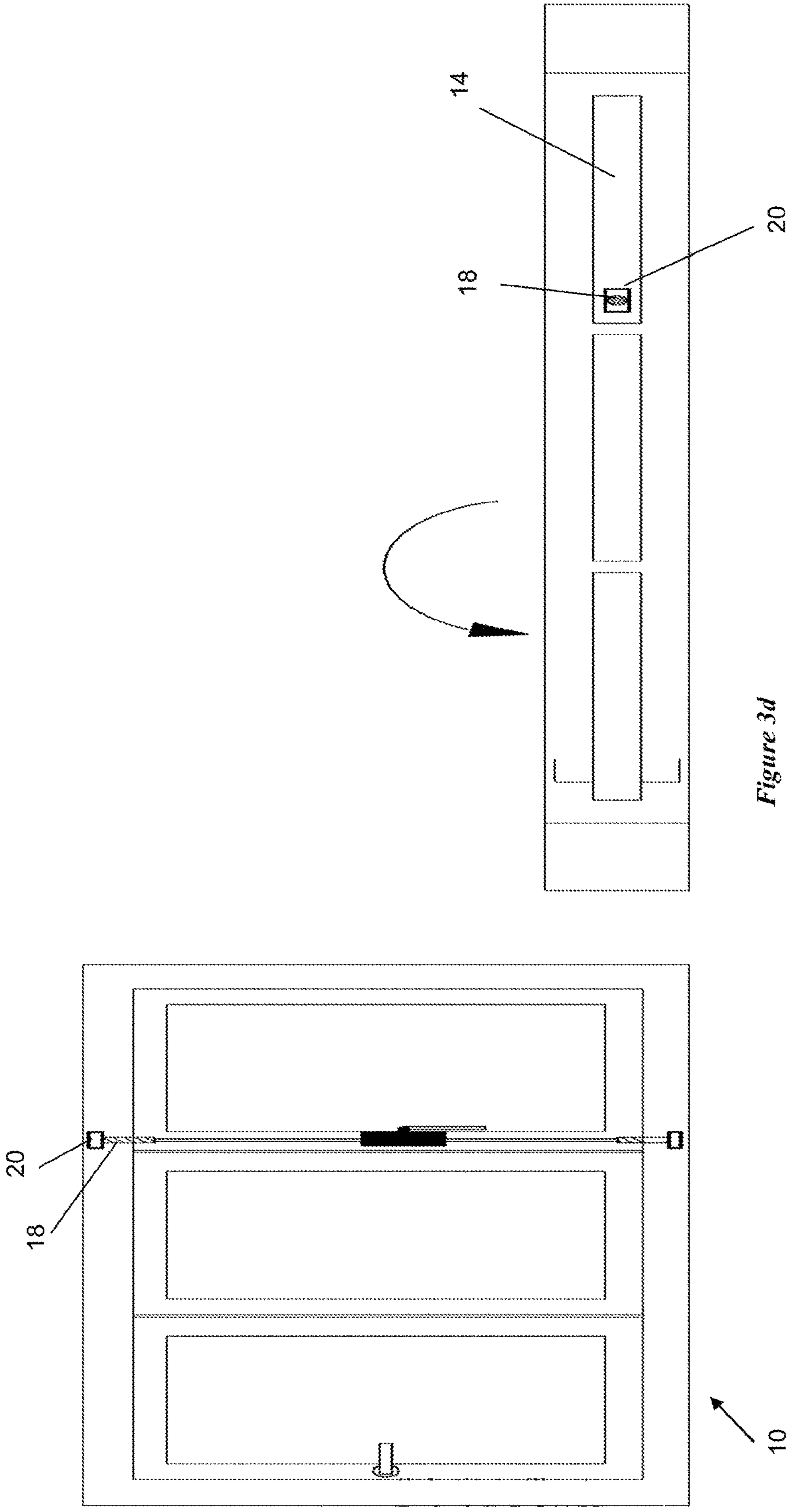

As shown in FIG. 3*a*, the bifold door 10 is fully open. To close the bifold door 10, the door panels are moved into alignment with the door frame 12 as shown in FIG. 3*b*. Once door panel 14 is properly aligned as shown in FIG. 3*c*, the magnetic bolt 18 of each latch mechanism 16 becomes aligned with the respective ferromagnetic block 20. Due to the magnetic attraction between the magnetic bolt 18 and the ferromagnetic block 20, the magnetic bolt 18 automatically moves into the respective channel opening of the door frame 12 so as to become magnetically engaged with the ferromagnetic block 20 as shown in FIG. 3*c*. In this position, the door panel 14 is locked against the door frame 12. Finally, the left most door panel is closed and locked against the door frame 12 in the conventional manner as shown in FIG. 3*d*.

Figure 4:
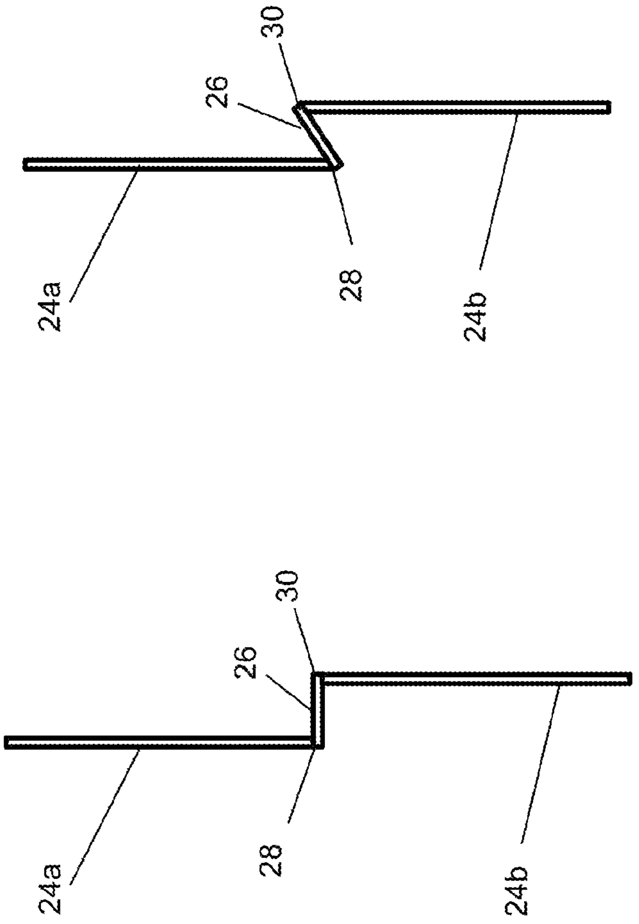
FIG. 4 is a schematic diagram illustrating the operation of a controller for the latch mechanism shown in FIGS. 2 and 3.

The lever handle 22 and the linking arms 24*a*, 24*b* can operate in a number of ways. The principle of operation for one example is shown in FIG. 4, wherein the linking arms 24*a*, 24*b* are connected by a transverse member 26. When the lever handle is moved anticlockwise, the transverse member 26 is also moved anticlockwise, causing a first end 28 of the transverse member 26 to move downwardly and an opposite second end 30 of the transverse member 26 to move upwardly. As linking arm 24*a* is connected to the first end 28 of the transverse member 26, the downward movement of the first end 28 causes the linking arm 24*a* to also move downwardly, thereby pulling the upper magnetic bolt 18 downwardly and away from the channel opening of the upper horizontal beam of the door frame 12. Similarly, as linking arm 24*b* is connected to the second end 30 of the transverse member 26, the upward movement of the second end 30 causes the linking arm 24*b* to also move upwardly, thereby pulling the lower magnetic bolt 18 upwardly and away from the channel opening of the lower horizontal beam of the door frame 12. Once the magnetic bolts 18 are moved out of their respective channel openings in the door frame 14, the door panel 14 is unlocked and no longer secured to the door frame 12.

Advantageously, the magnetic attraction between the magnetic bolt 18 and the ferromagnetic block 20 allows each latch mechanism 16 to automatically move into a latched position from an unlatched position when the bifold door 10 is closed and aligned with the door frame 12. Accordingly, the user does not have to remember to separately lock the door panel 14 of the bifold door 10 after closing the bifold door. The bifold door 10 according to an embodiment of the present invention thereby provides improved security and convenience.

Figures 5A, 5B:
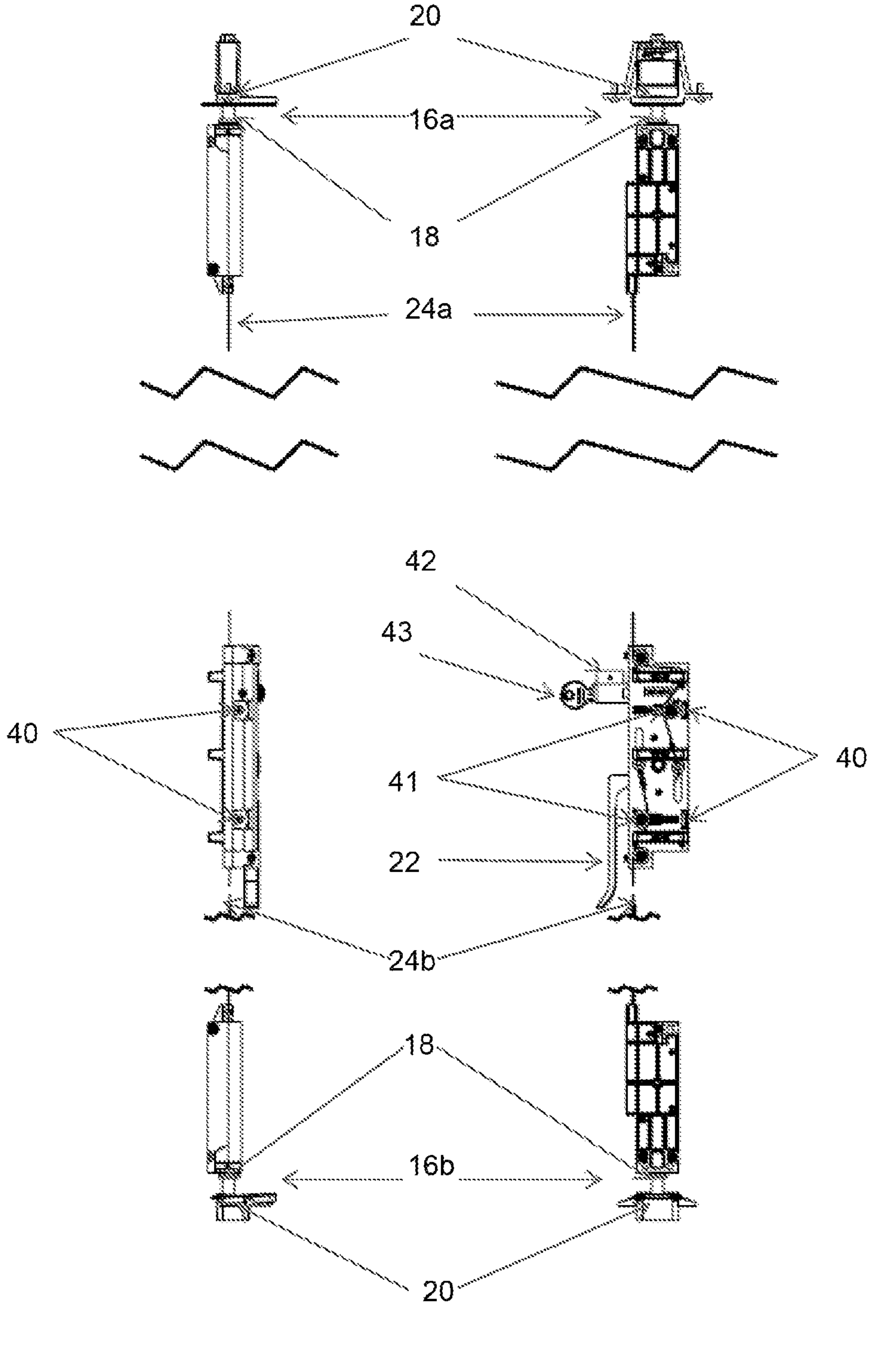
FIG. 5*a* illustrates an end view of a latch mechanism according to an embodiment of the present invention.
FIG. 5*b* illustrates a side view of a latch mechanism according to an embodiment of the present invention.

In FIGS. 5*a* and 5*b* there is shown an end view and a side view, respectively, of a pair of latch mechanisms 16*a*, 16*b*. Latch mechanism 16*a* is located in an upper region of a door or window panel (not shown) while latch mechanism 16*b* is located in a lower region of a door or window panel (not shown).

Each latch mechanism 16*a*, 16*b* includes a magnetic bolt 18 mounted in the panel and a ferromagnetic block 20 mounted in the door frame (not shown). The bolts 18 are shown in the latched position in which the magnetic attraction between the bolts 18 and the blocks 20 has resulted in the bolts 18 moving into abutment with the blocks 20 under a magnetic attraction.

The bolts 18 are connected to a controller in the form of a lever 22 by linkage members in the form of cables 24*a*, 24*b*. Actuation of the lever 22 results in the magnetic attraction between the bolts 18 and the blocks 20 being broken, and the bolts 18 being returned to the unlatched position. The bolts 18 are retained in the unlatched position under the natural bias of a spring (obscured).

The latch mechanisms 16*a*, 16*b* further comprise tension adjustment mechanisms. The tension adjustment mechanisms include a receiving portion 40 into which a tool (such as a screwdriver) is inserted. Rotation of the tool within the receiving portion 40 results in the lateral movement of pulleys 41 with which the cables 24*a*, 24*b* are associated. Depending on the direction in which the pulleys 41 are moved, the lateral movement of the pulleys 41 either increases or decreases the tortuous nature of the path along which the cables 24*a*, 24*b* travel. Increasing the tortuous nature of the path along which the cables 24*a*, 24*b* travel increases the tension in the cables 24*a*, 24*b*, thereby reducing any slack in the cables 24*a*, 24*b*. Conversely, decreasing the tortuous nature of the path along which the cables 24*a*, 24*b* travel decreases the tension in the cables 24*a*, 24*b*, thereby increasing any slack in the cables 24*a*, 24*b*. In this manner, the tension in the cables 24*a*, 24*b* may be adjusted as desired.

The latching mechanism 16*a*, 16*b* further comprise a locking mechanism comprising a key barrel 42 into which a key 43 may be inserted for locking and unlocking of the locking mechanism. The locking mechanism is located on an edge surface of the panel, and the key barrel 42 extends into the edge surface at an angle that is substantially parallel to the front surface of the panel.

Locking of the locking mechanism results in the locking of the lever 22 such that the lever 22 cannot be operated. Thus, locking of the locking mechanism prevents the bolts 16*a* and 16*b* from being retracted from their extended condition. This will prevent someone from releasing the bolts from the latched condition and thereby opening the door.

Figure 6:
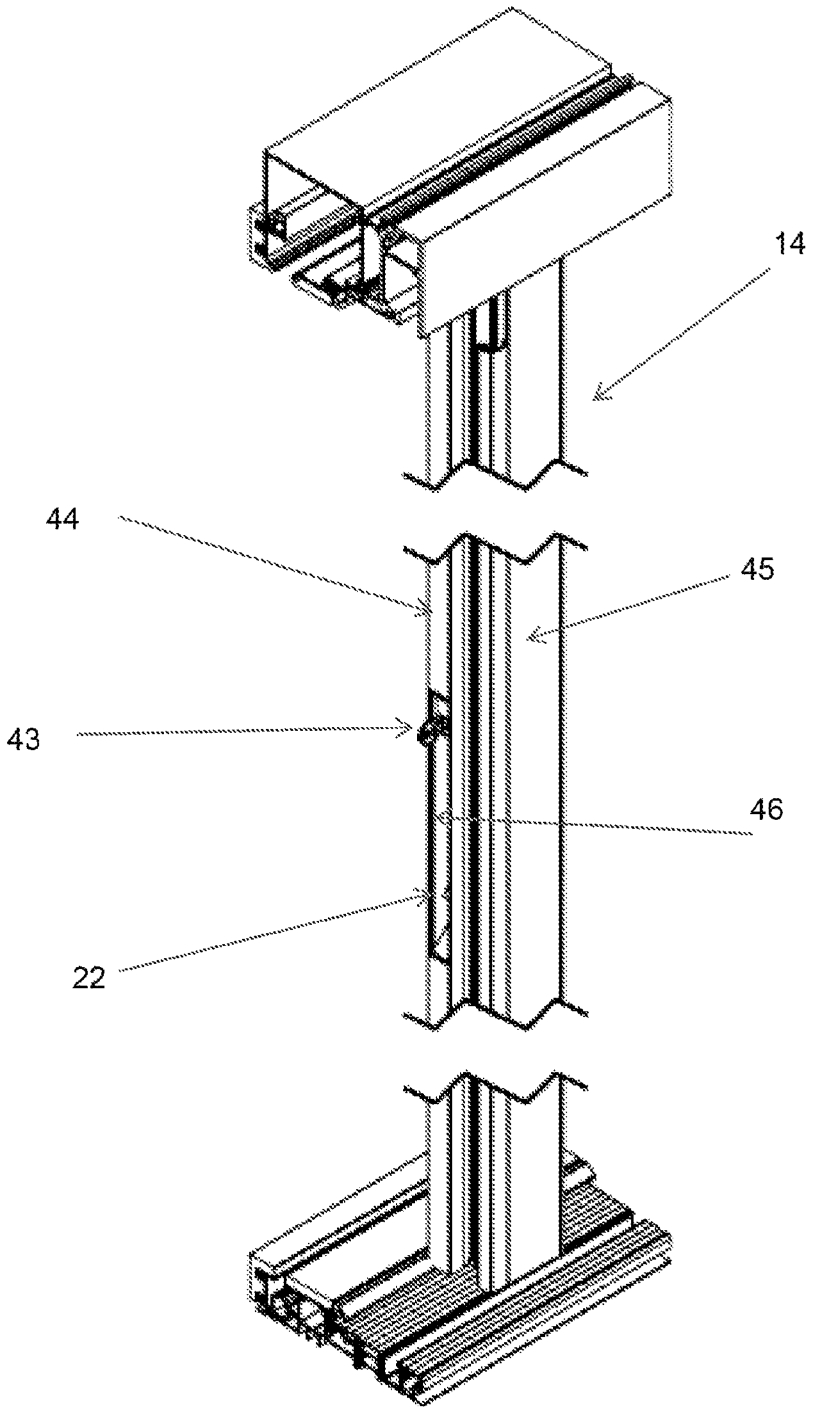
FIG. 6 illustrates an isometric view of a latch mechanism according to an embodiment of the present invention.

In FIG. 6 there is illustrated an isometric view of a latching mechanism (obscured) according to an embodiment of the present invention. In this Figure it may be more clearly seen that the locking mechanism is located on an edge surface 44 of the panel 14. The key barrel (obscured) and therefore also the key 43 extends into the edge surface 44 at an angle substantially perpendicular to the edge surface 44, and also substantially parallel to the front surface 45 of the panel 14.

It may be seen in this Figure that the lever 22 is housed within a recess 46 in the edge surface 44 so that the lever 22 is not visible from the front of the panel 14. This ensures that the aesthetic appeal of the door panel 14 is not disturbed by the lever 22 being visible to a person viewing the panel 14 from the front.

Figure 7A:
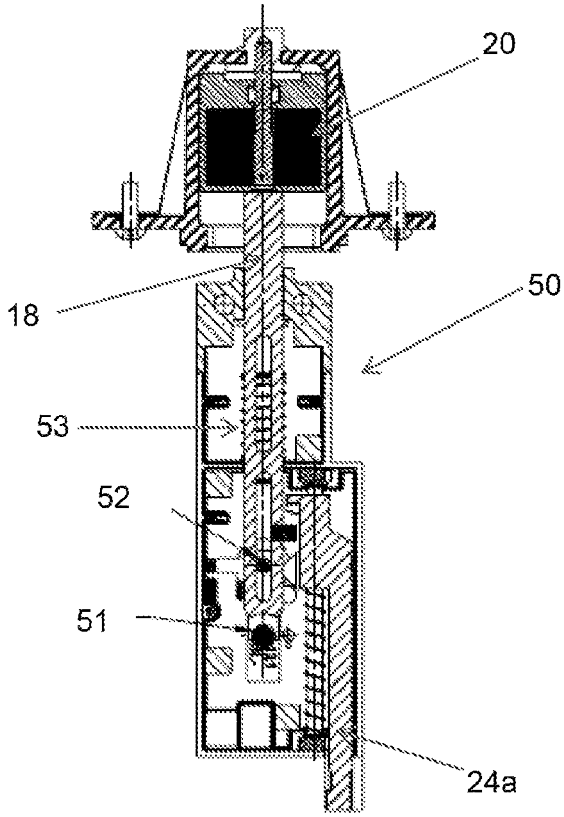
FIGS. 7A and 7B illustrate cross-sectional views of a latch mechanism according to an embodiment of the present invention in the latched condition and unlatched condition, respectively.
Figure 7B:
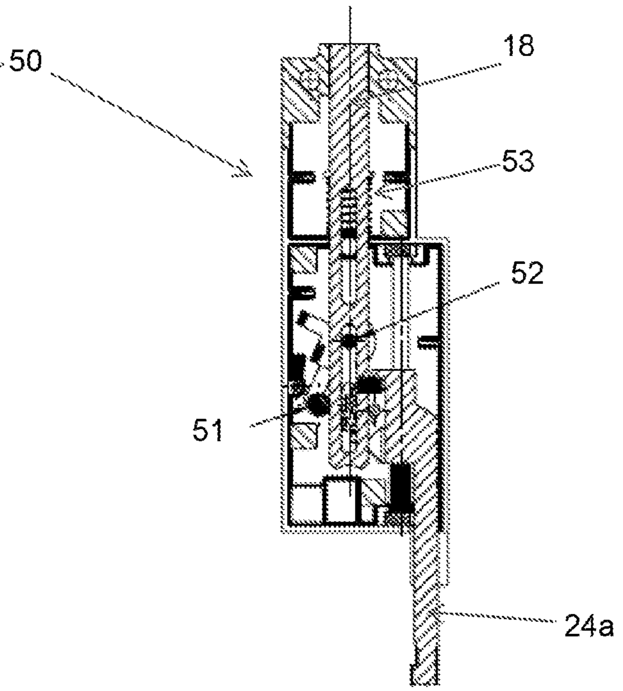

In FIGS. 7A and 7B there are illustrated cross-sectional views of a latch mechanism 50 according to an embodiment of the present invention. The latch mechanism 50 is shown in a latched condition in FIG. 7A and an unlatched condition in FIG. 7B.

In FIG. 7A the bolt 18 is shown magnetically engaged with a ferromagnetic block 20 which is located within the head of a window or door frame (not shown). The latch mechanism 50 of FIG. 7A is shown in a locked condition in which a locking member in the form of a bar 51 is pivoted about pivot pin 52 into the locked condition in which the bar 51 is located vertically below the bolt 18. In this way, the bolt 18 is prevented from moving from the latched condition shown in FIG. 7A to the unlatched condition shown in FIG. 7B. This will prevent the bolt being forced to the retracted position, for instance by a burglar applying force to the end of the bolt. This provides an effective deadlocking action.

Conversely, in FIG. 7B, the bar 51 has been pivoted about pivot pin 52 such that the bar 51 is no longer vertically below the bolt 18. Once the bar 51 is moved into this position, the bolt 18 may move from the latched condition to the unlatched condition when disengaged from the block (not shown in this Figure). Movement of the bolt 18 from the latched condition to the unlatched condition is achieved through actuation of the controller (not shown) that in turns results in the movement of linkage member 24*a*.

Typically, movement of the bar 51 between the locked condition shown in FIG. 7A and the unlocked condition shown in FIG. 7B is actuated by an initial translation of linkage member 24*a* before it begins to pull the bolt 18 against the magnetic force holding it in the extended condition.

It will also be noted that the latching mechanism 50 includes a biasing member in the form of a spring 53. In FIG. 7B, the spring 53 is naturally slightly compressed, such that movement of the bolt 18 towards the block 20 under magnetic attraction is assisted by the spring 53, but the compression of the spring 53 is not sufficient to overcome the effect of gravity when the bolt 18 is in the unlatched condition. Thus, unwanted movement of the bolt out of the latched condition except under the effect of a magnetic attraction to the block 20 is prevented.

Figure 8A:
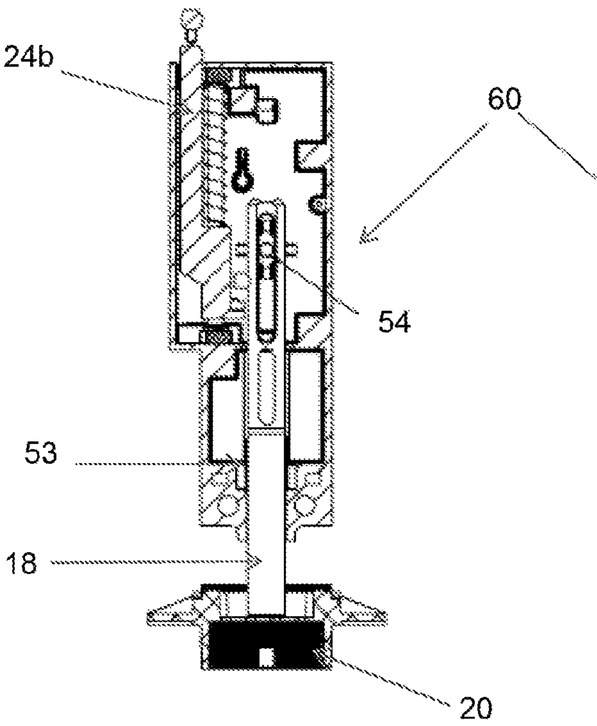
FIGS. 8A and 8B illustrate cross-sectional views of a latch mechanism according to an embodiment of the present invention in the latched condition and unlatched condition, respectively.
Figure 8B:
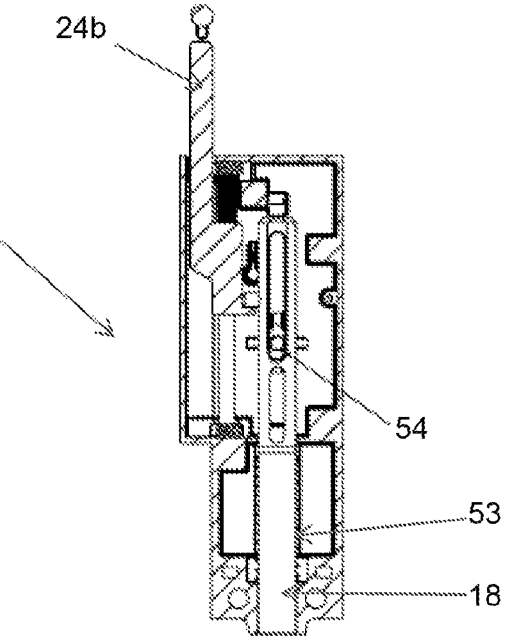

In FIGS. 8A and 8B there are illustrated cross-sectional views of a latch mechanism 60 according to an embodiment of the present invention. The latch mechanism 60 is shown in a latched condition in FIG. 8A and an unlatched condition in FIG. 8B.

In FIG. 8A the bolt 18 is shown magnetically engaged with a ferromagnetic block 20 which is located within the sill of a window or door frame (not shown).

Conversely, in FIG. 8B, the bolt 18 has moved from the latched condition to the unlatched condition upon disengagement from the block (not shown in this Figure). Movement of the bolt 18 from the latched condition to the unlatched condition is achieved through actuation of the controller (not shown) that in turns results in the movement of linkage member 24*b*.

It will also be noted that the latch mechanism 60 includes a biasing member in the form of a spring 53. In FIG. 8B, the spring 53 is naturally slightly compressed, such that the effect of gravity is not sufficient to cause unwanted movement of the bolt 18 out of the unlatched condition except under the magnetic attraction between the bolt 18 and the block 20. However, the magnetic attraction between the bolt 18 and the block 20 is sufficient to overcome the bias of the spring 53 and move the bolt 18 from the unlatched condition to the latched condition.

The latch mechanism 60 of FIGS. 8A and 8B further comprises a guide pin 54 associated with the bolt 18 and adapted to ensure that the bolt 18 moves consistently in a vertical direction.

Figure 9A:
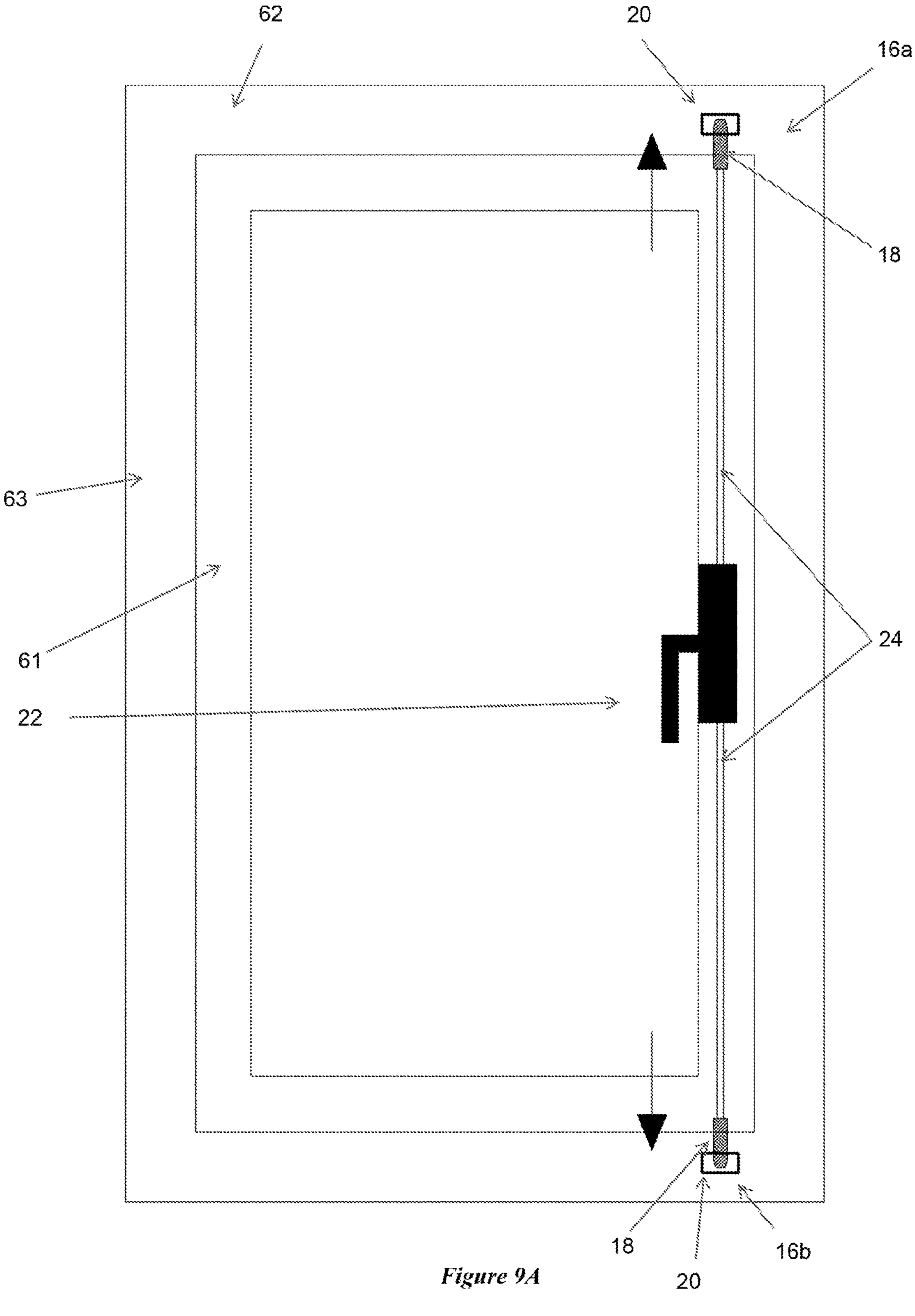
FIGS. 9A and 9B illustrate a front view and a plan view, respectively, of a latch mechanism according to an embodiment of the present invention when provided on a single panel door or window.
Figure 9B:
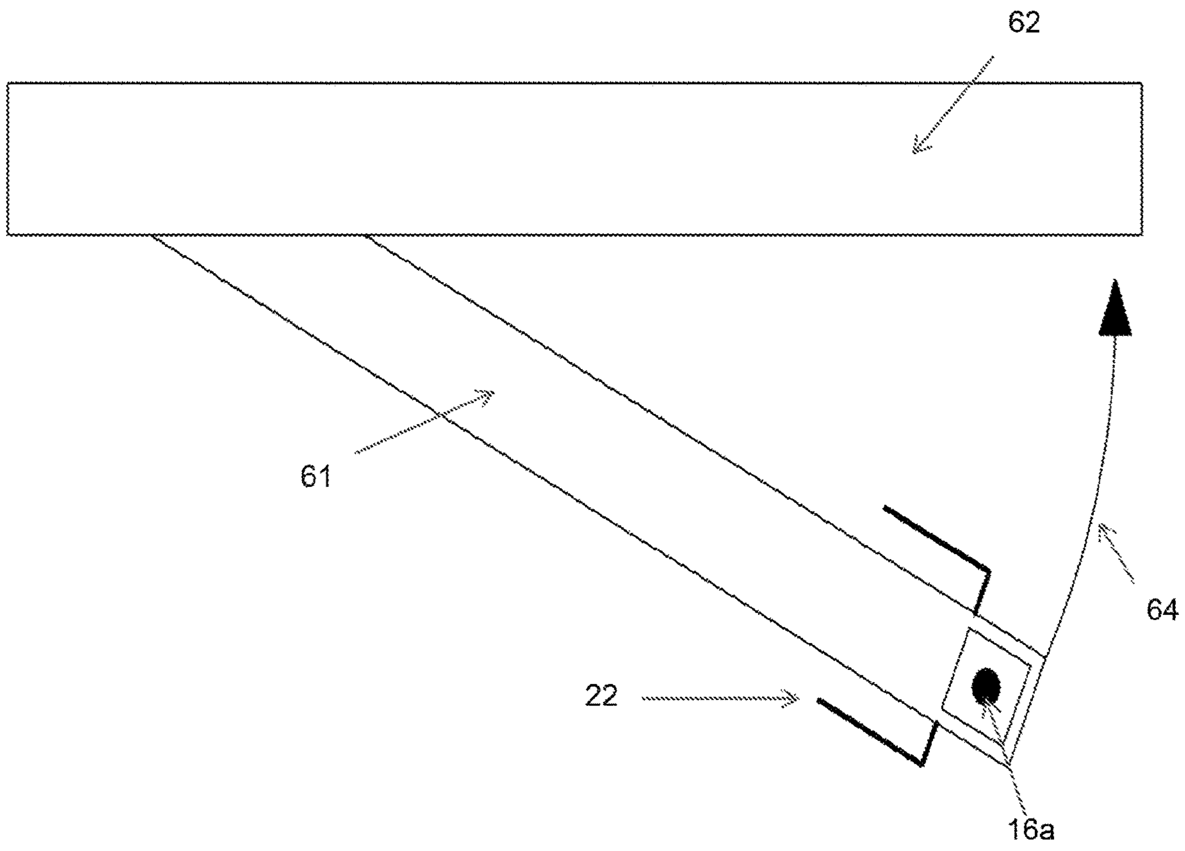

In FIGS. 9A and 9B there are illustrated side and plan views, respectively, of an upper latch mechanism 16*a* and a lower latch mechanism 16*b* provided on a single swinging door or window panel 61.

In FIG. 9B the panel 61 is shown in the open position such that access is provided through the door or window frame 62. The panel 61 is hingedly attached to a jamb 63.

In order to actuate latch mechanisms 16*a*, 16*b*, the panel 61 is closed by moving the panel 61 in the direction represented by arrow 64 in order to close the panel 61 within the frame 62. Once closed, the bolts 18 in the upper and lower latch mechanisms 16*a*, 16*b* move into the latched condition under a magnetic attraction with blocks 20 in the head and sill of the frame 62; respectively.

The bolts 18 are connected by linkage members 24 to a controller in the form of a handle 22. In the embodiment of the invention shown in FIGS. 9A and 9B, actuation of the handle 22 both moves the bolts 18 from the latch condition to the unlatched condition and allows a user to open the door or window to provide access therethrough.

Figure 10A:
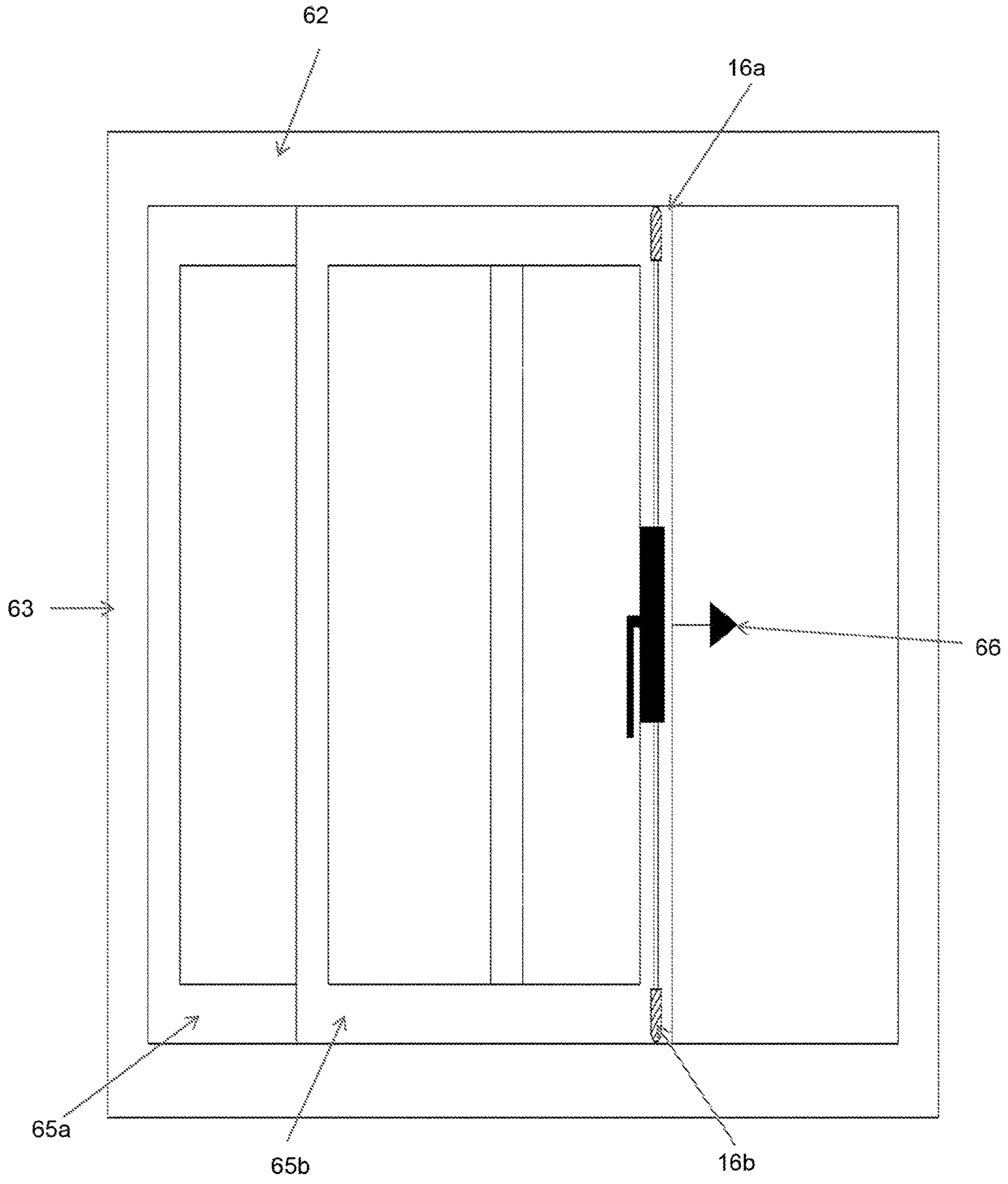
FIGS. 10A and 10B illustrate front views of a latch mechanism according to an embodiment of the present invention when provided on a sliding door or window.
Figure 10B:
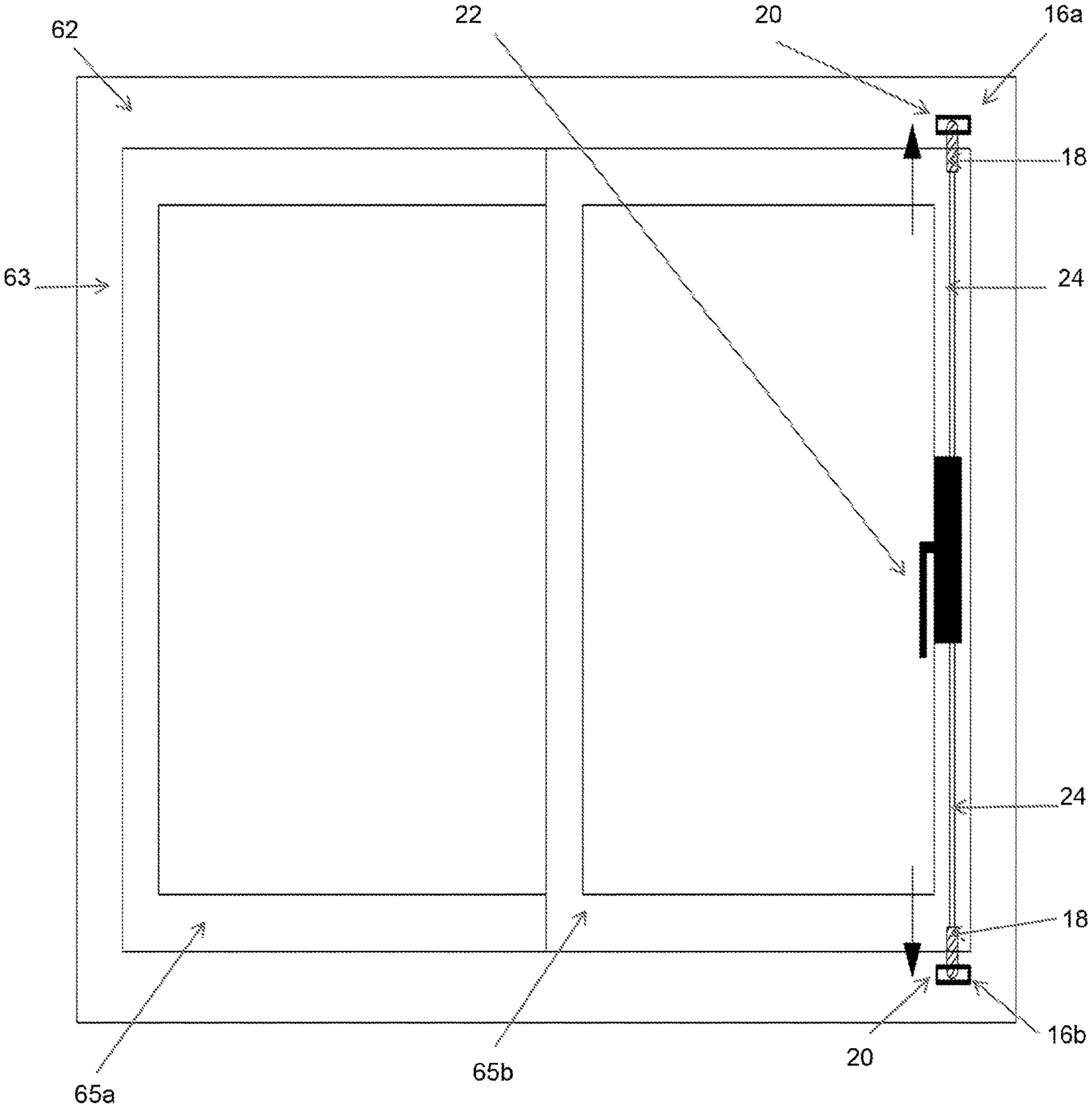

In FIGS. 10A and 10B there are illustrated front views of an upper latch mechanism 16*a* and a lower latch mechanism 16*b* according to an embodiment of the present invention when provided on a sliding door or window. The sliding door or window comprises a fixed panel 65*a* fixed to a jamb 63 of a door or window frame 62 and a moveable panel 65*b* capable of sliding movement relative to the fixed panel 65*a*.

In FIG. 10A, the sliding door or window is open, and the upper and lower latch mechanisms 16*a*, 16*b* are shown in the unlatched condition. However, when the sliding door or window is closed (by moving the sliding panel 65*b* in the direction of arrow 66 to the position shown in FIG. 10B) the upper and lower latch, mechanisms 16*a*, 16*b* move into the latched condition in which the bolts 18 move into the latched condition under a magnetic attraction with blocks 20 in the head and sill of the frame 62, respectively.

The bolts 18 are connected by linkage members 24 to a controller in the form of a handle 22. In the embodiment of the invention shown in FIGS. 10A and 10B, actuation of the handle 22 both moves the bolts 18 from the latch condition to the unlatched condition and allows a user to open the door or window (by sliding the sliding panel 65*b* relative to the fixed panel 65*a*) to provide access therethrough.

In the present specification and claims (if any), the word ‘comprising’ and its derivatives including ‘comprises’ and ‘comprise’ include each of the stated integers but does not exclude the inclusion of one or more further integers.

Reference throughout this specification to ‘one embodiment’ or ‘an embodiment’ means that a particular feature, structure, or characteristic described in connection with the embodiment is included in at least one embodiment of the present invention. Thus, the appearance of the phrases ‘in one embodiment’ or ‘in an embodiment’ in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A latch mechanism for latching a door or window panel to a frame, wherein the door or window panel comprises a front surface, a back surface, and one or more edge surfaces extending between the front and back surfaces, the latch mechanism comprising:

- a pair of first members, a first of the pair of first members being located in an upper region of either the door or window panel or the frame, and a second of the pair of first members being located in a lower region of either the door or window panel or the frame;
- a pair of second members, a first of the pair of second members being located in an upper region of the other of the door or window panel or the frame to the first of the pair of first members and a second of the pair of second members being located in a lower region of the other of the door or window panel or the frame to the second of the pair of first members, each second member being movable between an unlatched position and a latched position wherein the first of the pair of second members is brought into abutment with, or close proximity to, the first of the pair of first members and the second of the pair of second members is brought into abutment with, or close proximity to, the second of the pair of first members; and
- a controller comprising a handle,
- wherein the second members are adapted to move from the unlatched position to the latched position under a magnetic attraction to the respective first members when the door or window panel is brought into a closed condition,
- wherein each second member is coupled to the controller via one or more linkage members, the linkage members comprising one or more cables and at least one linking arm,
- wherein a locking member, being located in the upper region of the other of the door or window panel or the frame to the first of the pair of first members, or being located in the lower region of the other of the door or window panel or the frame to the second of the pair of first members, engages at least one of the second members to prevent the at least one of the second members from being forced from the latched position to the unlatched position by force applied to an end of the at least one of the second members, and one of the at least one linking arm actuates the locking member to disengage from the at least one of the second members,
- wherein the latch mechanism is provided with a tension adjustment mechanism adapted to adjust the tension in the one or more linkage members, and
- wherein actuation of the controller results in moving each second member from the latched position to the unlatched position, and wherein slack is allowed to exist between the at least one linking arm and the second member when the second members are in the unlatched position such that, as the first and second members are brought into proximity with one another, the slack between the at least one linking arm and the second member is sufficient to allow movement under magnetic attraction of the second members towards the first members into the latched position.

2. A latch mechanism according to claim 1 wherein the first members are located on the frame and the second members are located on the door or window panel.

3. A latch mechanism according to claim 2 wherein the second members are magnetic rods, bars or bolts configured for mounting on or adjacent an upper and/or lower edge of the door or window panel.

4. A latch mechanism according to claim 2 wherein the second members are at least partially received in recesses within the door or window panel when in the unlatched position.

5. A latch mechanism according to claim 1 wherein the first members are ferromagnetic blocks mounted on the frame.

6. A latch mechanism according to claim 1 wherein the controller comprises one or more handles, buttons, levers, dials or a combination thereof.

7. A latch mechanism according to claim 1 wherein the tension adjustment mechanism includes one or more tension adjustment members that adjust the position of the at least one linking arm in order to increase or decrease the degree of slack between the linking arm and the second member.

8. A latch mechanism according to claim 1 wherein the latch mechanism further comprises a locking mechanism located on an edge surface of the door or window panel.

9. A latch mechanism according to claim 8 wherein the locking mechanism includes a key barrel that extends into the door or window panel at an angle substantially perpendicular to the edge surface of the panel.

10. A latch mechanism according to claim 8 wherein locking of the locking mechanism precludes the second members from moving between the unlatched position and the latched position.

11. A latch mechanism according to claim 1 wherein the latch mechanism further includes one or more biasing members adapted to bias the second members into the unlatched position once the magnetic attraction between the first members and the second members is broken.

12. A door or window panel including a latch mechanism for securing the panel to a frame, wherein the door or window panel comprises a front surface, a back surface, and one or more edge surfaces extending between the front and back surfaces, the latch mechanism including:

a pair of first members, a first of the pair of first members being located in an upper region of the frame, and a second of the pair of first members being located in a lower region of the frame;

a pair of second members, a first of the pair of second members being located in an upper region of the door or window panel and a second of the pair of second members being located in a lower region of the door or window panel, each second member being movable between an unlatched position and a latched position; and a controller comprising a handle, wherein the first of the pair of second members is brought into abutment with, or close proximity to, the first of the pair of first members and the second of the pair of second members is brought into abutment with, or close proximity to, the second of the pair of first members, wherein the second member is adapted to move from the unlatched position to the latched position under a magnetic attraction to one of the first members when the door or window panel is brought into a closed condition, wherein each second member is coupled to the controller via one or more linkage members, the one or more linkage members comprising one or more cables and at least one linking arm, wherein a locking member, being located in the upper region of the other of the door or window panel or the frame to the first of the pair of first members, or being located in the lower region of the other of the door or window panel or the frame to the second of the pair of first members, engages at least one of the second members to prevent the at least one of the second members from being forced from the latched position to the unlatched position by force applied to an end of the at least one of the second members, and one of the at least one linking arm actuates the locking member to disengage from the at least one of the second members, wherein the latch mechanism is provided with a tension adjustment mechanism adapted to adjust the tension in the one or more linkage members, wherein actuation of the controller results in moving the second members from the latched position to the unlatched position, and wherein slack is allowed to exist between the at least one linking arm and the second member when the second members are in the unlatched position such that, as the first and second members are brought into proximity with one another, the slack between the at least one linking arm and the second member is sufficient to allow movement under magnetic attraction of the second members towards the first members into the latched position.

13. A door or window assembly having a plurality of door or window panels, wherein at least one panel includes a latch mechanism for securing the at least one panel to a frame, wherein the door or window panel comprises a front surface, a back surface, and one or more edge surfaces extending between the front and back surfaces, the latch mechanism including:

a pair of first members, a first of the pair of first members being located in an upper region of the frame, and a second of the pair of first members being located in a lower region of the frame;

a pair of second members, a first of the pair of second members being located in an upper region of the door or window panel and a second of the pair of second members being located in a lower region of the door or window panel, each second member being movable between an unlatched position and a latched position; and a controller comprising a handle, wherein the first of the pair of second members is brought into abutment with, or close proximity to, the first of the pair of first members and the second of the pair of second members is brought into abutment with, or close proximity to, the second of the pair of first members, wherein the second member is adapted to move from the unlatched position to the latched position under a magnetic attraction to one of the first members when the door or window panel is brought into a closed condition, wherein each second member is coupled to the controller via one or more linkage members, the one or more linkage members comprising one or more cables and at least one linking arm, wherein a locking member, being located in the upper region of the other of the door or window panel or the frame to the first of the pair of first members, or being located in the lower region of the other of the door or window panel or the frame to the second of the pair of first members, engages at least one of the second members to prevent the at least one of the second members from being forced from the latched position to the unlatched position by force applied to an end of the at least one of the second members, and one of the at least one linking arm actuates the locking member to disengage from the at least one of the second members, wherein the latch mechanism is provided with a tension adjustment mechanism adapted to adjust the tension in the one or more linkage members, wherein actuation of the controller results in moving the second members from the latched position to the unlatched position, and wherein slack is allowed to exist between the at least one linking arm and the second member when the second members are in the unlatched position such that, as the first and second members are brought into proximity with one another, the slack between the at least one linking arm and the second member is sufficient to allow movement under magnetic attraction of the second members towards the first members into the latched position.

14. A door or window according to claim 13 wherein the door or window panels are sliding door or window panels or folding door or window panels.

* * * * *